United States Patent
Shen et al.

(10) Patent No.: US 9,448,460 B2
(45) Date of Patent: Sep. 20, 2016

(54) IMAGING USING METAMATERIALS

(71) Applicant: Washington University, St. Louis, MO (US)

(72) Inventors: Jung-Tsung Shen, St. Louis, MO (US); Yuecheng Shen, St. Louis, MO (US); Lihong Wang, St. Louis, MO (US)

(73) Assignee: WASHINGTON UNIVERSITY, St. Louis, MO (US)

( * ) Notice: Subject to any disclaimer, the term of this patent is extended or adjusted under 35 U.S.C. 154(b) by 0 days.

(21) Appl. No.: 15/046,725

(22) Filed: Feb. 18, 2016

(65) Prior Publication Data

US 2016/0161826 A1    Jun. 9, 2016

Related U.S. Application Data

(60) Division of application No. 14/047,459, filed on Oct. 7, 2013, now Pat. No. 9,298,060, which is a continuation-in-part of application No. 13/716,531, filed on Dec. 17, 2012, now abandoned.

(60) Provisional application No. 61/577,760, filed on Dec. 20, 2011.

(51) Int. Cl.
*G02F 1/35* (2006.01)
*H04N 5/225* (2006.01)

(52) U.S. Cl.
CPC .......... *G02F 1/3501* (2013.01); *H04N 5/2256* (2013.01)

(58) Field of Classification Search
USPC ......... 359/245, 254, 326–332, 346; 348/359, 348/362; 29/428
See application file for complete search history.

(56) References Cited

U.S. PATENT DOCUMENTS

| | | | |
|---|---|---|---|
| 5,348,687 A | 9/1994 | Beck et al. | |
| 5,973,316 A * | 10/1999 | Ebbesen | B82Y 20/00 250/216 |
| 6,285,020 B1 | 9/2001 | Kim et al. | |
| 7,027,689 B2 | 4/2006 | Blumberg et al. | |
| 7,206,114 B2 | 4/2007 | Ballato et al. | |
| 7,417,219 B2 | 8/2008 | Catrysse et al. | |
| 7,586,670 B2 | 9/2009 | Chowdhury et al. | |
| 8,587,856 B2 | 11/2013 | Chen et al. | |
| 2006/0286311 A1 | 12/2006 | Okazaki et al. | |

(Continued)

OTHER PUBLICATIONS

Shen et al., "Mechanism for Designing Metallic Metamaterials with a High Index of Refraction", May 17, 2005, pp. 197401-1 to 197401-4, (Physical Review Letters) PRL 94, The American Physical Society.

(Continued)

*Primary Examiner* — Daniel Petkovsek
(74) *Attorney, Agent, or Firm* — Armstrong Teasdale LLP

(57) ABSTRACT

A system for imaging an object is provided. The system includes a light source configured to emit light having a predetermined wavelength towards the object. The system further includes a metalens including a metallic film having a plurality of slits defined therethrough, the plurality of slits having a width a and a periodicity d that are both less than the predetermined wavelength, wherein the object is positioned between the light source and the metalens. The system further includes a detector configured to acquire measurements indicative of light transmitted through the metalens, and a computing device communicatively coupled to the detector and configured to reconstruct an image of the object based on the acquired measurements.

11 Claims, 20 Drawing Sheets

(56) References Cited

U.S. PATENT DOCUMENTS

| | | | |
|---|---|---|---|
| 2008/0278728 A1* | 11/2008 | Tetz | G01N 21/554 356/445 |
| 2009/0225401 A1 | 9/2009 | Chen et al. | |
| 2012/0069344 A1* | 3/2012 | Liu | G01B 9/04 356/450 |

OTHER PUBLICATIONS

Pimenov et al., "Experimental demonstration of artificial dielectrics with a high index of refraction", Nov. 9, 2006, pp. 193102-1 to 193102-3, (Physical Review Letters) PRL 74, The American Physical Society.

Catrysse et al., "Guided modes supported by plasmonic films with a periodic arrangement of subwavelength slits", Jan. 17, 2006, pp. 031101-1 to 031101-3, Applied Physics Letters 88, American Institute of Physics.

Shin et al., "Cut-Through Metal Slit Array as an Anisotropic Metamaterial Film", IEEE Journal of Selected Topics in Quantum Electronics, Nov./Dec. 2006, pp. 1116 to 1122, vol. 12, No. 6.

Shin et al., "Three-Dimensional Metamaterials with an Ultrahigh Effective Refractive Index over a Broad Bandwidth", Mar. 5, 2009, pp. 093903-1 to 093903-4, (Physical Review Letters) PRL 102, The American Physical Society.

Fan et al., "Second harmonic generation from patterned GaAs inside a subwavelength metallic hole array", Oct. 16, 2006, Optics Express, vol. 14, issue 21, pp. 9570-9575.

Rakic et al., "Optical Properties of metallic films for vertical-cavity optoelectronic devices", Optical Society of America, Aug. 1, 1998, pp. 5271-5283, Applied Optics, vol. 37, No. 22.

Shen et al., "Properties of a one-dimensional metallophotonic crystal", The American Physical Society, Jul. 8, 2004, pp. 035101-1to035101-8, Physical Review B 70.

Smith, et al., "Homogenization of metamaterials by field averaging (invited paper)", J. Opt. Soc. Am. B, Mar. 3, 2006, pp. 391-403, vol. 23, No. 3.

Liu et al., "Subwavelength Discrete Solitons in Nonlinear Metamaterials", PRL 99, Oct. 12, 2007, pp. 153901-1 to 153901-4, Physical Review Letters.

Porto et al., "Optical bistability in subwavelength slit apertures containing nonlinear media", Physical Review B 70, Aug. 13, 2004, pp. 081402-1 to 081402-4, The American Physical Society.

Porto et al., "Transmission Resonances on Metallic Gratings with Very Narrow Slits", Physical Review Letters, Oct. 4, 1999, pp. 2845-2848, The American Physical Society, vol. 83, No. 14.

Feng, etal., "Optical Field Concentration in Low-Index Waveguides", Sep. 2006, pp. 885 to 890, IEEE Journal of Quantum Electronics, vol. 42, No. 9.

Almeida et al., "Guiding and confining light in void nanostructure", Jun. 1, 2004, pp. 1209-1211, Optics Letters, Optical Society of America, vol. 29, No. 11.

Soljacic et al., "Optimal bistable switching in nonlinear photonic crystals", Nov. 11, 2002, pp. 055601-1 to 055601-4, Physical Review E 66.

Bayindir et al., "Tight-Binding Description of the Coupled Defect Modes in Three-Dimensional Photonic Crystals", Mar. 6, 2000, pp. 2140-2143, Physical Review Letters, vol. 84, No. 10.

Xu et al., "Experimental demonstration of guiding and confining light in nanometer-size low-refractive-index material", Jul. 15, 2004, pp. 1626-1628, Optics Letters, vol. 29, No. 14.

Akahane et al., "High-Q photontonic nanocavity in a two-dimensional phototonic crystal", Oct. 30, 2003, pp. 944-947, Nature, vol. 425, Nature Publishing Group.

Armani et al., "Ultra-high-Q toroid microcavity on a chip", Feb. 27, 2003, pp. 925-928, Nature, vol. 421, Nature Publishing Group.

Spillane et al., "Ultralow-threshold Raman laser using a spherical dielectric microcavity", Feb. 7, 2002, pp. 621-623, Macmillan Magazines Ltd.

Inoue et al., "Observation of small group velocity in two-dimensional AlGaAs-based photonic crystal slabs", Mar. 12, 2002, pp. 121308-1to121308-4, Physical Review B, vol. 65, The American Physical Society.

Notomi et al., "Extremely Large Group-Velocity Dispersion of Line-Defect Waveguides in Photonic Crystal Slabs", Dec. 17, 2001, pp. 253902-1to253902-4, Physical Review Letters, vol. 87, No. 25.

Pendry et al., "Magnetism from Conductors and Enhanced Nonlinear Phenomena", Nov. 1999, pp. 2075-2084, IEEE Transactions on Microwave Theory and Techniques, vol. 47, No. 11.

* cited by examiner

IMAGING USING METAMATERIALS

CROSS-REFERENCE TO RELATED APPLICATIONS

This application is a division of U.S. patent application Ser. No. 14/047,459 (now U.S. Pat. No. 9,298,060) filed Oct. 7, 2013, which is a continuation-in-part of U.S. patent application Ser. No. 13/716,531 filed Dec. 17, 2012, which claims the benefit of U.S. Provisional Application No. 61/577,760 filed Dec. 20, 2011, all of which are hereby incorporated by reference in their entirety.

BACKGROUND

Nonlinear materials give rise to a multitude of optical phenomena that have important applications in technology and fundamental science. One example is wave mixing, in which light of two different frequencies can be added or subtracted through nonlinear optical responses to create light at new frequencies. Wave mixing is an important optical process since it is able to generate light at frequencies that are not available in typical lasers and/or frequencies for which efficient photodetectors are available. Another example is optical bistability, in which the intensity of output light can take two distinct stable values for a given input, creating an optical two-state system. Bistable devices, such as optical logic gates and memory, are important for optical computing, which has the potential for much faster computation speeds than those in current computation devices. Yet another example is self-focusing, in which a light pulse through an optical fiber with suitable nonlinearity can maintain its shape when propagating a long distance in the fiber. Self-focusing is important for long-distance telecommunications.

The degree of optical nonlinearity in a material depends upon the strength of the optical field, and varies across different materials. For a nonlinear material of the Kerr-type, the relative permittivity, $\in$, is dependent upon the electric field, E, as expressed by $\in(E)=\in_l+\chi^{(3)}|E|^2$, where $\in_l$ is the linear relative permittivity of the material and $\chi^{(3)}$ is the third-order nonlinear coefficient of the material. The nonlinear contribution to optical processes becomes significant when $\chi^{(3)}|E|^2$ is of the order of $\in_l$, which is generally realized with a relatively strong electric field, as the third-order nonlinear coefficient is relatively small in naturally occurring optical materials. Accordingly, intense laser light is typically needed to observer nonlinear optical phenomena, limiting the application of nonlinear optics.

At least some nonlinear optical components utilize nonlinear resonators for switching and modulation. However, a modulation speed and an available fractional bandwidth of known high quality-factor (high-Q) nonlinear resonators are reduced by the relatively large Q values.

For at least some known imaging applications, the diffraction limit restricts the resolution of conventional microscopy to no less than half an operating wavelength, as evanescent waves that carry subwavelength information decay exponentially. By measuring an evanescent field directly, near-field scanning optical microscopy (NSOM) exhibits a high resolution beyond the diffraction limit. The resolution of NSOM, which depends on the size of the aperture regardless of the operating wavelength, has been demonstrated down to 20 nanometers (nm). However, for an aperture with size r in an infinitely thin film made of perfect metal, the transmitted power is proportional to $(r/\lambda)^4$, where $\lambda$ is the wavelength of the normal incident light. For a relatively small aperture in a metal with finite thickness and conductance the transmitted power is even weaker.

To enhance the transmitted power, various possible designs with a single aperture have been proposed, ranging from periodic corrugations to the C-shape apertures, which have been shown to enhance the transmission efficiency by two to three orders of magnitude. Further, subwavelength periodic apertures have been demonstrated to achieve improved transmission for potential applications for near field microscopy. However, at least some known strongly coupled periodic apertures exist in such a configuration that each measurement contains the information from all the apertures. Therefore, decomposing the coupled measurements to reconstruct an image may be relatively difficult.

BRIEF DESCRIPTION

In one aspect, a system for imaging an object is provided. The system includes a light source configured to emit light having a predetermined wavelength towards the object. The system further includes a metalens including a metallic film having a plurality of slits defined therethrough, the plurality of slits having a width a and a periodicity d that are both less than the predetermined wavelength, wherein the object is positioned between the light source and the metalens. The system further includes a detector configured to acquire measurements indicative of light transmitted through the metalens, and a computing device communicatively coupled to the detector and configured to reconstruct an image of the object based on the acquired measurements.

In another aspect, a method for imaging an object is provided. The method includes positioning the object between a light source and a metalens, wherein the metalens includes a metallic film having a plurality of slits defined therethrough, the plurality of slits having a width a and a periodicity d. The method further includes emitting light from the light source towards the object, wherein the emitted light has a predetermined wavelength greater than the width a and the periodicity d. The method further includes acquiring, using a detector, measurements indicative of light transmitted through the metalens, and reconstructing, using a computing device communicatively coupled to the detector, an image of the object based on the acquired measurements.

In yet another aspect, a method for determining a refractive index profile of an object is provided. The method includes positioning the object in front of a metalens that includes a plurality of slits defined therethrough, emitting light having a predetermined wavelength towards the object and the metalens, acquiring, using at least one detector, a plurality of electric field measurements at a plurality of positions of the object relative to the metalens, and determining, using a computing device coupled to the at least one detector, the refractive index profile of the object based on the acquired electric field measurements.

BRIEF DESCRIPTION OF THE DRAWINGS

The embodiments described herein may be better understood by referring to the following description in conjunction with the accompanying drawings.

DETAILED DESCRIPTION

Embodiments provide a system for imaging an object using a metalens. The metalens includes a two-dimensional array including a metallic film having periodic slits. The metalens exhibits artificial dielectric behaviors and can be precisely mapped into a homogeneous dielectric slab. Further, the periodic structure results in a relatively high transmission of incident light. Using the metalens, reconstructed images have a resolution much smaller than a wavelength of the incident light.

Figure 1:
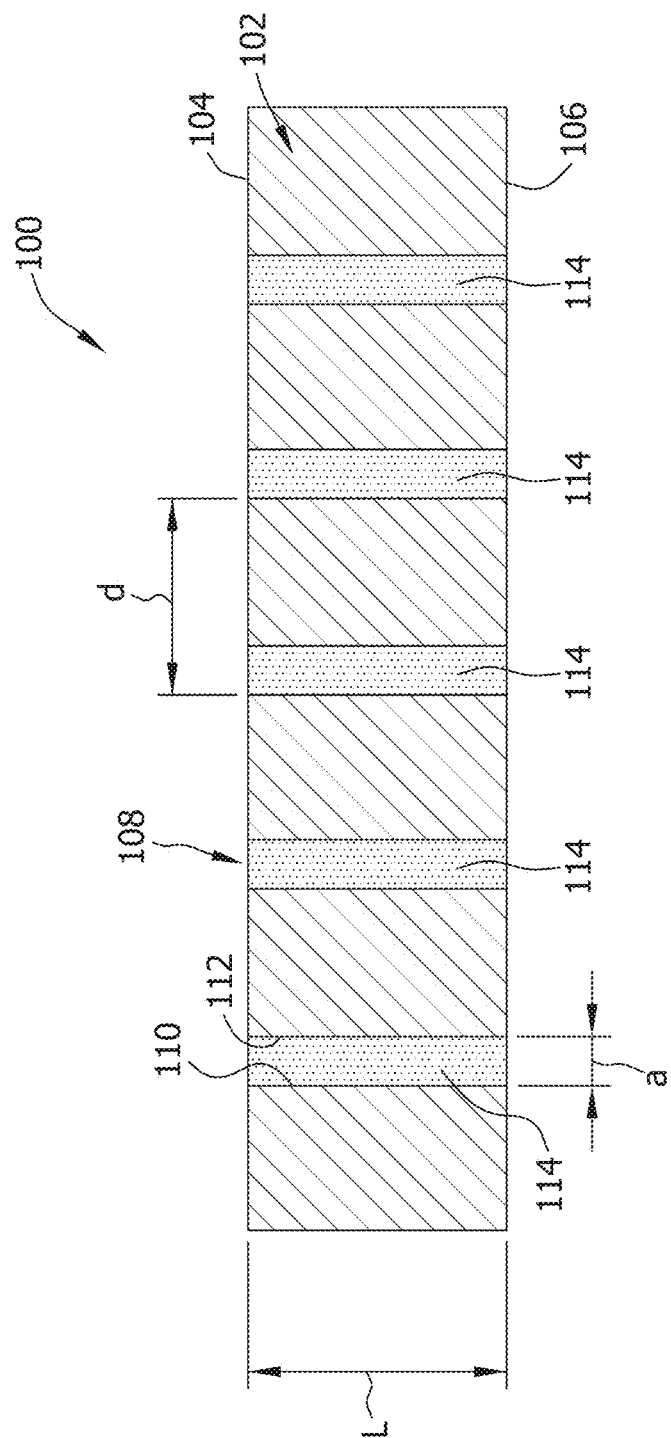
FIG. 1 is a schematic diagram of a two-dimensional array having an enhanced nonlinear response to light.

FIG. 1 is a schematic diagram of a two-dimensional array 100 having an enhanced nonlinear response to light. Array 100 includes a film 102 that includes a first surface 104 and an opposite second surface 106. A thickness, L, of film 102 is defined as the distance between first surface 104 and second surface 106.

As shown in FIG. 1, a plurality of slits 108 are defined through film 102 extending from first surface 104 to second surface 106. Slits 108 are each defined by a first edge 110 and an opposite second edge 112. A width, a, of each slit 108 is defined as the distance between first edge 110 and second edge 112. Slits 108 in array 100 have a periodicity, d.

Periodicity d is defined as the distance from a first edge 110 of a slit 108 to a first edge 110 of an adjacent slit 108. As shown in FIG. 1, d>a.

Film 102 is composed of a metallic material. For example, film 102 may be composed of gold, silver, aluminum, and/or any other metal that enables array 100 to function as described herein. In the exemplary embodiment, metallic material has a thickness greater than a skin depth of the material. Array 100 further includes a plurality of dielectric elements 114 that are located in slits 108. Specifically, for each slit 108, dielectric element 114 is positioned between first edge 110 and second edge 112 and extends from first surface 104 to second surface 106. Dielectric elements 114 are composed of a nonlinear material having a relative permittivity, $\in$. Dielectric elements 114 may be composed of, for example, fused silica having a nonlinear index of $3 \times 10^{-16}$ cm$^2$/W.

For Kerr-type nonlinear materials, such as dielectric elements 114 the relative permittivity can be expressed as a function of an electric field, E, as $\in(E) = \in_l + \chi^{(3)}|E|^2$, where $\in_l$ is the linear relative permittivity of dielectric element 114 and $\chi^{(3)}$ is the third-order nonlinear coefficient of dielectric element 114.

While in the exemplary embodiment, dielectric element 114 is a Kerr-type nonlinear material that exhibits third order nonlinearity, the systems and methods described herein may also be implemented using Pockels-type nonlinear materials that exhibit second order nonlinearity. For a Pockels-type dielectric element, the relative permittivity can be expressed as $\in(E) = \in_l + \chi^{(2)}|E|$, where $\in_l$ is the linear relative permittivity of the dielectric element and $\chi^{(2)}$ is the second-order nonlinear coefficient of the dielectric element.

Generally, the order of magnitude of $\chi^{(3)}$ in units of centimeters squared per Farad squared (cm$^2$/F$^2$) is $10^{-16}$ to $10^{-14}$ for glasses, $10^{-14}$ to $10^{-17}$ for doped glasses, and $10^{-10}$ to $10^{-8}$ for organic materials. Accordingly, as $\chi^{(3)}$ is generally relatively small, the nonlinear component of $\in$ becomes significant when the applied electric field E is relatively large. Accordingly, without a substantially large electric field, the practical application of nonlinear properties of naturally occurring nonlinear materials is fairly limited. However, using the metamaterials described herein, a nonlinear response to light can be generated at a lower electric field, as described herein.

Given the configuration of array 100, there exists a transverse electromagnetic (TEM) mode between slits 108 for incident light having a transverse magnetic (TM) polarization. The TEM mode allows for transmission of light through slits 108 when the periodicity, d, is much smaller than the wavelength of the incident light, $\lambda$. Under these conditions, the light squeezes through slits 108, resulting in a significant increase in the field intensity, E, within slits 108. The amplified field intensity causes dielectric elements 114 to experience a larger intensity than the incident field, such light transmitted through silts 108 has a larger nonlinear response. Accordingly, array 100 exhibits an enhanced nonlinear response.

To understand the enhanced nonlinearity of array 100, array 100 can be mathematically mapped to an effective uniform dielectric slab. That is, array 100 responds to light in the same way that an effective uniform dielectric slab would respond. Array 100 is mapped to the effective uniform dielectric slab using a unit cell correspondence, in which potential difference, instantaneous power flow, and energy between two equivalent unit cells are conserved.

Figure 2:
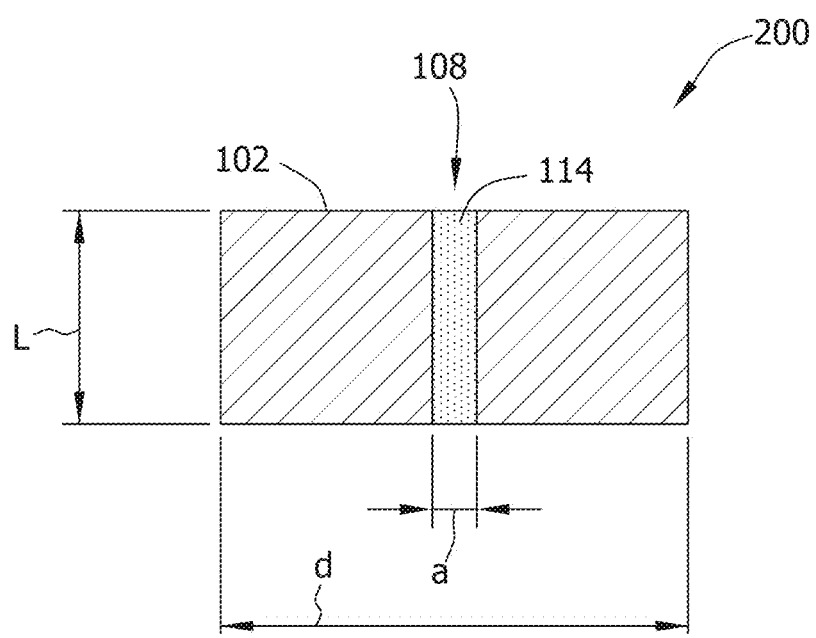
FIG. 2 is a unit cell representation of the array shown in FIG. 1.
Figure 3:
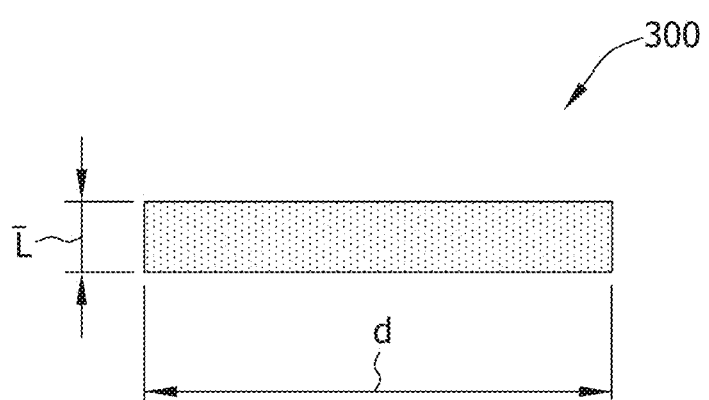
FIG. 3 is a unit cell representation of an effective uniform dielectric slab.

FIG. 2 is a unit cell 200 of array 100. FIG. 3 is a unit cell 300 of a uniform dielectric slab. Unit cell 200 and unit cell 300 each have a width of periodicity d. Unit cell 200 has a thickness L, and unit cell 300 has a thickness $\overline{L}$. For the purposes of mapping unit cell 200 to unit cell 300, it is assumed that film 102 allows no field penetration (i.e., light only passes through slit 108).

The potential difference over unit cell 200 is a·E, as the field cannot penetrate film 102. The potential difference over unit cell 300 is d·$\overline{E}$, where E is the electric field in unit cell 200, and $\overline{E}$ is the electric field in unit cell 300. Setting the potential differences of unit cell 200 and unit cell 300 equal to each another, the electric field scaling condition becomes $$\overline{E} = E\left(\frac{a}{d}\right).$$

The instantaneous power flow over unit cell 200 is (E×H)×a, and the instantaneous power flow over unit cell 300 is ($\overline{E}$×$\overline{H}$)×d, where H is the magnetic field in unit cell 200, and $\overline{H}$ is the magnetic field in unit cell 300. Setting the instantaneous power flows of unit cell 200 and unit cell 300 equal to each other, and using $$\overline{E} = E\left(\frac{a}{d}\right),$$

the magnetic field scaling condition becomes $\overline{H}$=H.

The energy over unit cell 200 is ½($\in$E²+μH²)×L×a, where $\in$ is the relative permittivity of dielectric element 114, and μ is the permeability of dielectric element 114. The energy over unit cell 300 is ½($\overline{\in}\overline{E}^2+\overline{\mu}\overline{H}^2$)×$\overline{L}$×d, where $\overline{\in}$ is the relative permittivity of the dielectric slab and $\overline{\mu}$ is the permeability of the dielectric slab. Assuming that $$\overline{\mu} = \mu = 1 \text{ and } \overline{L} = L\left(\frac{a}{d}\right),$$

and using the scaling conditions above, when the energies of unit cell 200 and unit cell 300 are set equal to each other, the permittivity scaling condition becomes $$\overline{\varepsilon} = \varepsilon\left(\frac{d}{a}\right)^2.$$

Accordingly, $$\overline{\varepsilon} = \left(\frac{d}{a}\right)^2 (\varepsilon_l + \chi^{(3)}|E|^2) = \overline{\varepsilon}_l + \overline{\chi}^{(3)}|\overline{E}|^2,$$

where $\overline{\in}_l$ is the linear relative permittivity of unit cell 300, and $\overline{\chi}^{(3)}$ the third-order nonlinear coefficient of unit cell 300.

From these equations, it can be determined that $$\overline{\varepsilon}_l = \varepsilon\left(\frac{d}{a}\right)^2 \text{ and } \overline{\chi}^{(3)} = \chi^{(3)}\left(\frac{d}{a}\right)^4.$$

Performing similar calculations for a Pockels-type material, it can be determined that $$\overline{\chi}^{(2)} = \chi^{(2)}\left(\frac{d}{a}\right)^3.$$

Thus, the effective third-order nonlinear coefficient $\overline{\chi}^{(3)}$ of array 100 is the third-order nonlinear coefficient of dielectric element 114 amplified by a factor of $$\left(\frac{d}{a}\right)^4.$$

As such, by manipulating the ratio of d to a in array 100, the nonlinear properties of dielectric element 114 can be significantly enhanced. For example, when the ratio of d to a is 4, the third-order nonlinear coefficient of array 100 is 256 times the third-order nonlinear coefficient of dielectric element 114.

The permittivity scaling condition $$\overline{\varepsilon} = \varepsilon\left(\frac{d}{a}\right)^2$$

is asymptotically exact at deep subwavelength scales, λ/d>>1. In some embodiments, to extend this to all subwavelength scales, a general scaled mapping is derived using small refinements to the simple scaled mapping as $$\overline{\varepsilon}_l = \varepsilon_c\left(\frac{d}{a}\right)^2 \varepsilon_l, \overline{\chi}^{(2)} = \chi_c^{(2)}\left(\frac{d}{a}\right)^3 \chi^{(2)}$$

for second order, and $$\overline{\chi}^{(3)} = \chi_c^{(3)}\left(\frac{d}{a}\right)^4 \chi^{(3)}$$

for third order, where the dielectric refinements are $\in_c$, $\chi_c^{(2)}$, and $\chi_c^{(3)}$. The values of the dielectric refinements are calculated from the linear solutions of the dielectric grating. The linear dielectric refinements $\in_c$ is calculated by matching the linear permittivity of the simple scaled mapping to yield identical transmission coefficients of the metal-dielectric grating, and solved using $$T_{grating}^{-1} = 1 + \frac{((d/a)^2 \varepsilon_l \varepsilon_c - 1)^2}{4(d/a)^2 \varepsilon_l \varepsilon_c} \sin^2\left(\frac{2\pi}{\lambda} \overline{L}(d/a)\sqrt{\varepsilon_l \varepsilon_c}\right).$$

The nonlinear dielectric refinements are calculated by dividing the electric fields within the slit by the fields with corrected linear permittivity as $$\chi_c^{(2)} = \left(\frac{E}{(d/a)E_c}\right)^3$$

for second order and $$\chi_c^{(3)} = \left(\frac{E}{(d/a)E_c}\right)^4$$

for third-order nonlinearity. Calculating the refinements yields an exact mapped optical response of the grating. These refinements are generally very small, on the order of 1 percent, and produce the same order of magnitude enhancement for nonlinear materials. When $\in_c$ is small, $\chi_c^{(2)}$ and $\chi_c^{(3)}$ are approximately 1. By calculating the refinements, a general scaled mapping is produced with full accuracy over all subwavelength scales.

Notably, for a given value of d/a, array 100 will not exhibit an enhanced nonlinear response in the transmission direction (i.e. through array 100) for all frequencies of incident light. Specifically, at certain frequencies, the transmission of light through array 100 is relatively small, and most of the incident light is reflected by array 100. At such frequencies, array 100 will not exhibit an enhanced nonlinear response. Accordingly, the non-linear response of array 100 is dependent at least in part on the frequency of the incident light. In the exemplary embodiment, the frequency of the incident light is 1.55 microns. Alternatively, incident light may have any frequency that enables array 100 to function as described herein.

To demonstrate the enhanced nonlinear response of array 100, light transmission through array 100 and the effective dielectric slab was simulated. The first simulation demonstrated the mapping in wave mixing transmission, specifically third harmonic generation, in which a single frequency generates new light at three times the incident frequency through frequency summing within the nonlinear material. This was simulated over many incident intensities. The second simulation demonstrated variation in the transmission of third harmonic generation over a range of film thicknesses, while keeping a constant incident intensity. The third simulation demonstrated the mapping in optical bistability. From the results of each simulation, the robustness of the mapping between array 100 and the effective dielectric slab was demonstrated for different film thicknesses, intensities, and wavelengths.

Figure 4:
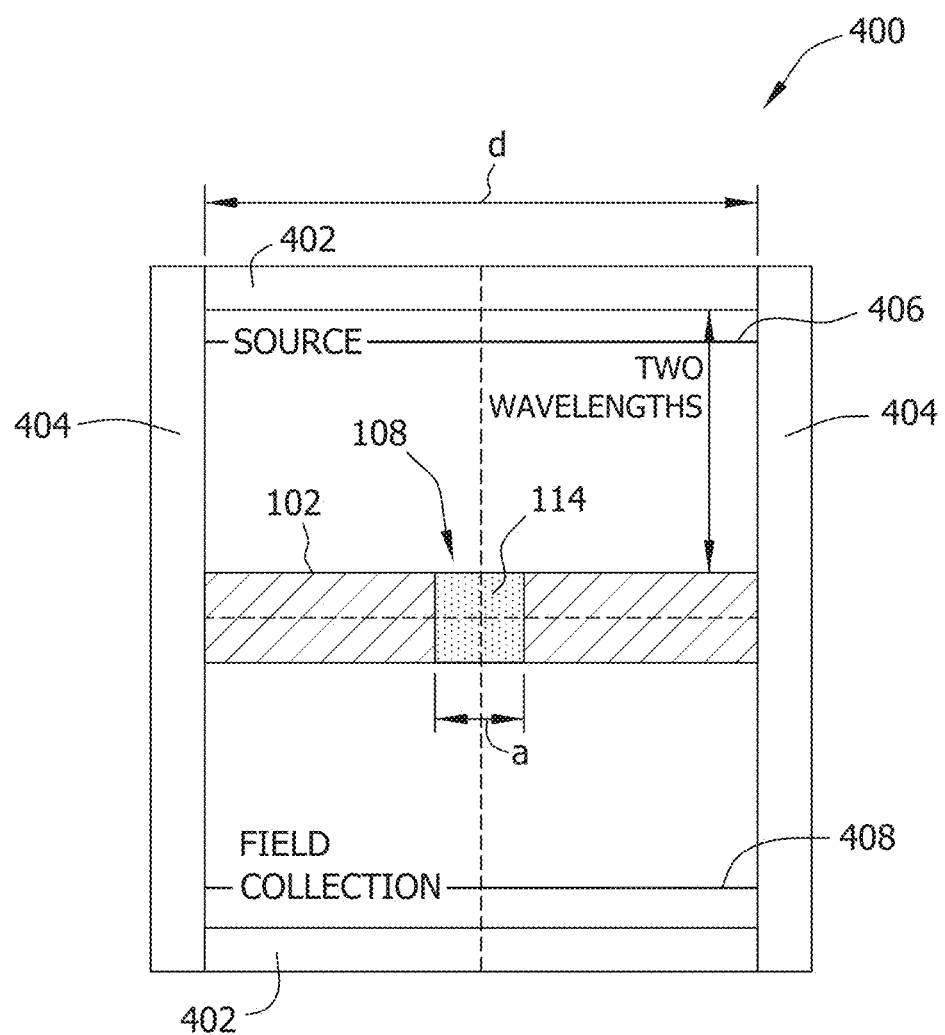
FIG. 4 is a schematic diagram of a setup that may be used to simulate the array shown in FIG. 1.

FIG. 4 is a schematic diagram of a setup 400 that was used to perform the simulations for array 100. The periodic system geometry and material definitions were defined at the center of the computational domain, and film 102 ran along the center of the horizontal axis. The width of the computational domain was one full periodicity, d, of the periodic system geometry, with slit 108 and dielectric element 114 centered within film 102. Since the computational domain was symmetric about the vertical axis, a symmetry condition was applied along that axis to reduce computational work by half.

To eliminate reflections at the top and bottom of the computational domain, PML (perfectly-match-layers) 402, near-perfect absorbers of electromagnetic waves, were applied at the top and bottom boundary ends of the computational domain. A thickness of PMLs 402 was adjusted to one-half of the incident source wavelength, λ. A periodic boundary condition 404 was applied to a left edge and a right edge of the computational domain, although all simulations were performed with light at normal incidence to the film 102.

A plane-wave source 406 was used to generate light at a single wavelength, λ, and intensity, and was located just below the top PML 402. The distance between source 406 and the film 102 was two wavelengths. The electric and magnetic field data was collected at a data collection point 408 just above the bottom PML 402. The distance between data collection point 408 and film 102 was also two wavelengths. In total, the length of the computational domain was five wavelengths plus the film thickness, L. A similar setup was used for the uniform dielectric slab, except that only one spatial dimension was used, due to the uniformity of the slab across the horizontal axis. This reduced the computational time of the effective slab results.

The first simulation of the mapping between array 100 and the effective dielectric slab demonstrated the transmission of incident and third harmonic light over a range of intensities at normal incidence to film 102. Since the index of refraction, n, of nonlinear optical materials is intensity dependent, the transmission of both the first and third harmonic frequency was expected to vary with intensity. In this simulation, array 100 had the following parameters: λ=12, d/a=4, $n_o$=1.5, a=0.1, λ/d=30, L=35.2, and $\chi^{(3)}$=3.9× $10^{-5}$, where $n_o$ is the index of refraction of dielectric element 114 (note these are in scale invariant units). Using the mapping from the above equations, the effective slab had the following parameters: λ=12, $\overline{\in}_l$=36, $\overline{L}$=8.8, and $\overline{\chi}^{(3)}$=0.01.

Figure 5:
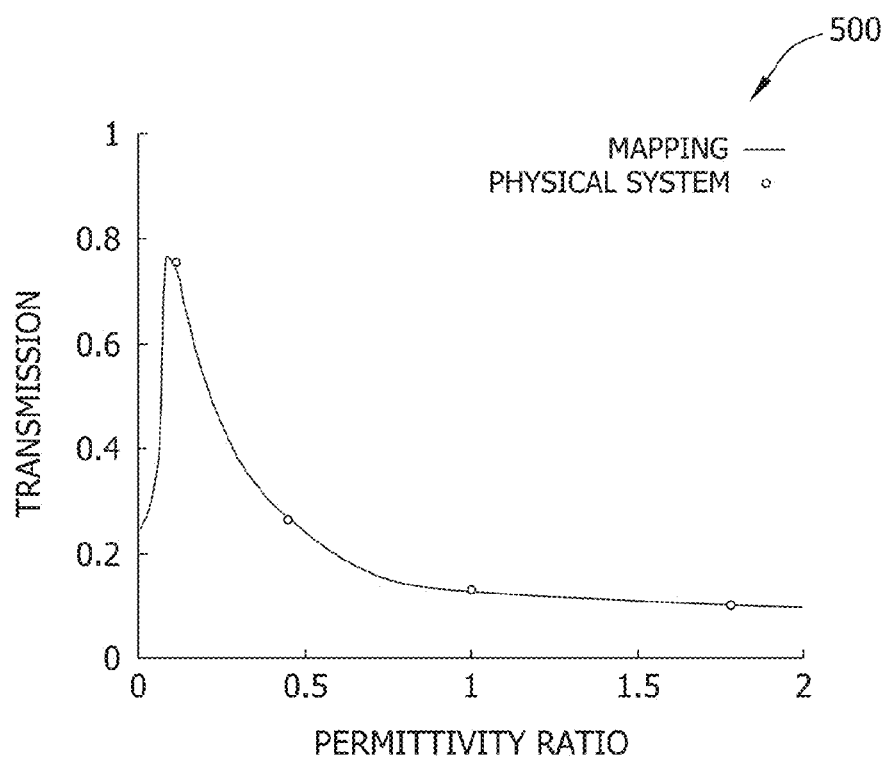
FIG. 5 is a graph illustrating transmission of incident light versus a permittivity ratio.
Figure 6:
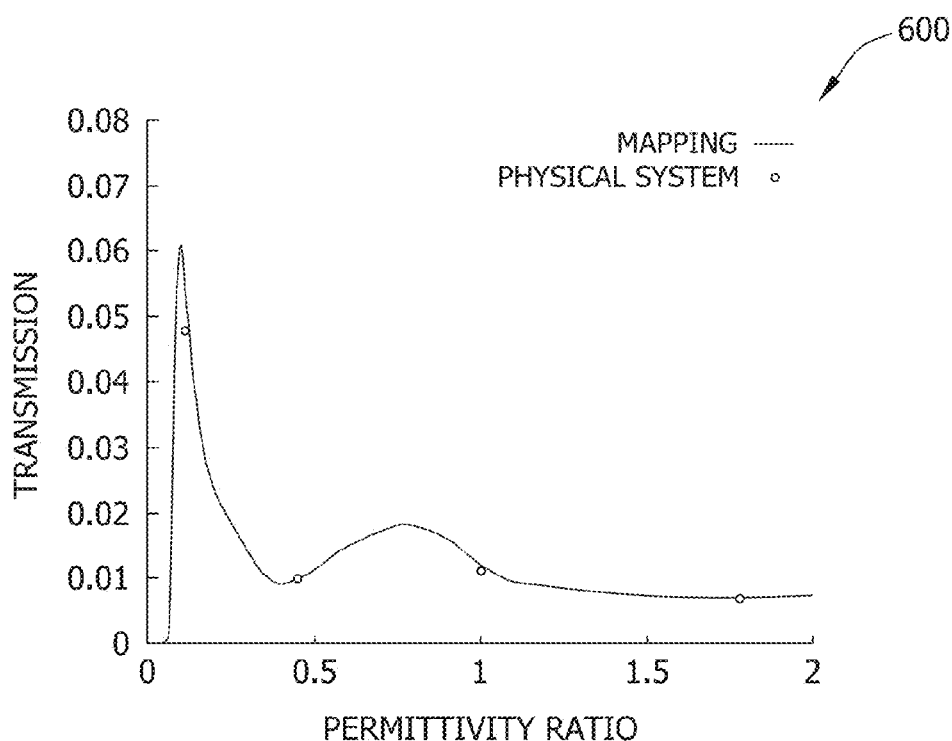
FIG. 6 is a graph illustrating transmission of incident light versus a permittivity ratio.

FIG. 5 is a graph 500 illustrating transmission of incident light versus a permittivity ratio. FIG. 6 is a graph 600 illustrating transmission of third harmonic light versus a permittivity ratio. The transmission of the incident and third harmonic light was quantified using transmission coefficients defined as follows, $$T_\omega = \frac{|E_\omega|^2}{|E_0|^2}$$

for the incident frequency, and $$T_{3\omega} = \frac{|E_{3\omega}|^2}{|E_0|^2}$$

for the third harmonic frequency. For graphs 500 and 600, the points represent the calculated transmission coefficients for array 100, and the line represents the calculated transmission coefficients or the effective dielectric slab. The transmission coefficients were plotted versus the permittivity ratio, $$\frac{\chi^{(3)}|E_0|^2}{\varepsilon_l},$$

which expresses the magnitude of the nonlinear part of the total permittivity $\chi^{(3)}|E_0|^2$, over the linear part, $\in_l$. Accordingly, the permittivity ratio varies linearly with incident intensity $|E_0|^2$.

Graphs 500 and 600 demonstrate significant variation in transmission with incident intensity. The transmission at the incident and third harmonic frequencies increases as the intensity is increased until 0.14 permittivity ratio is reached, where both frequencies have a maximum transmission of 0.75 and 0.06 respectively. Past 0.14, the transmission coefficients decrease. At 0.40, however, the transmission of third harmonic increases once again, whereas the transmission of incident light continues to decrease.

For both the incident and third harmonic light, the transmission of array 100 substantially agrees with the mapping to the transmission of the effective dielectric slab. Slight differences in the final calculations are a result of the fundamental assumption that array 100 experiences deep subwavelength resonance. For larger $\lambda/d$, this error would be reduced. Thus, the first simulation establishes that array 100 acts as a uniform dielectric slab with an index of refraction of 6 and nonlinear index of 0.01, which results in an overall increase of 4 in the index of refraction and an increase of 256 in the third-order nonlinear coefficient of dielectric element 114.

The second simulation of the mapping between array 100 and the effective dielectric slab demonstrated the transmission of the incident and third harmonic light over a range of film thicknesses L, while keeping the field intensity fixed at a normal incidence to film 102. The transmission at both the incident and third harmonic frequencies was expected to vary with film thickness, as wave mixing is very sensitive to variations in film thickness variation. In this simulation, array 100 had the following parameters: $\lambda=16$, $d/a=8$, $n_o=1.5$, $a=0.1$, $|E_0|=200$, $\lambda/d=20$, $L_0=32/3$, and $\chi^{(3)}=2.44\times 10^{-6}$ (note these are in scale invariant units). Using the mapping from the above equations, the effective slab had the following parameters: $\lambda=16$, $\overline{\in}_f=144$, $\overline{L}_o=4/3$, and $\overline{\chi}^{(3)}=0.01$.

Figure 7:
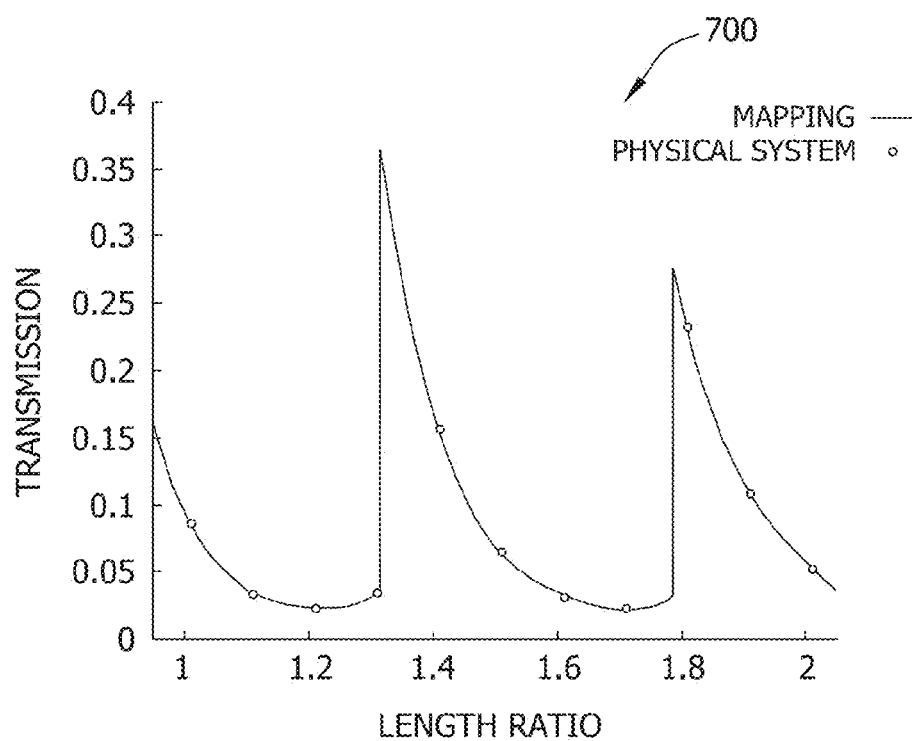
FIG. 7 is a graph illustrating transmission of incident light versus a length ratio.
Figure 8:
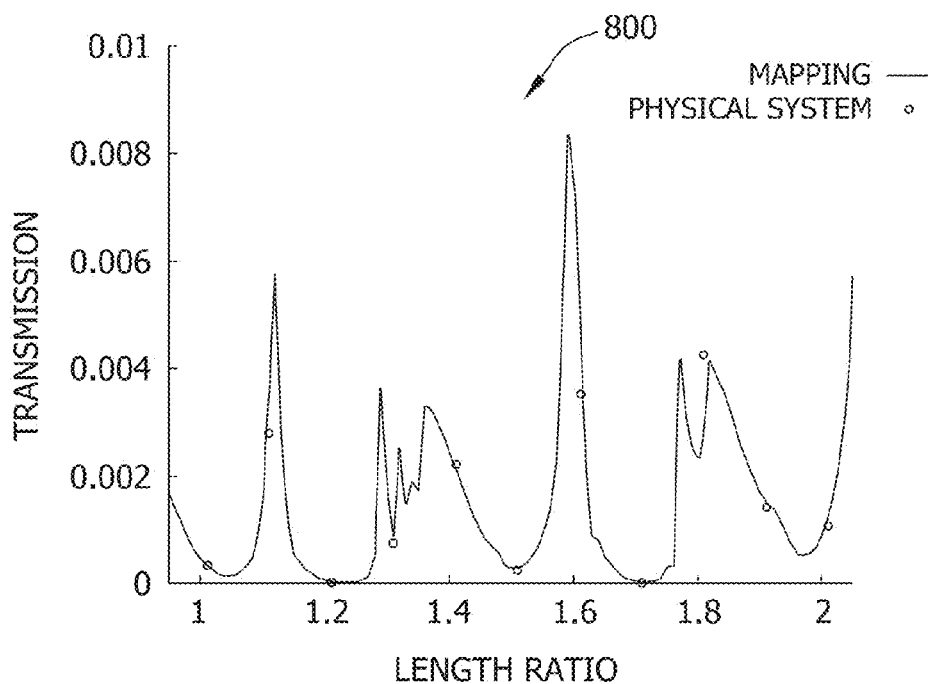
FIG. 8 is a graph illustrating transmission of incident light versus a length ratio.

FIG. 7 is a graph 700 illustrating transmission of incident light versus a length ratio. FIG. 8 is a graph 800 illustrating transmission of third harmonic light versus a length ratio. The transmission of the incident and third harmonic light were quantified using transmission coefficients defined as in the first simulation. For graphs 700 and 800, the points represent the calculated transmission coefficients for array 100, and the line represents the calculated transmission coefficients of the effective dielectric slab. The transmission coefficients were plotted versus length ratio, $L/L_0$, which expresses the film thickness L over the defined film thickness $L_0$.

Graphs 700 and 800 both display a multitude of nonlinear optical effects with film thickness. The transmission of the incident and third harmonic frequencies are periodic, with a transmission periodicity of 0.45 in length ratio. The transmission at the incident frequency exhibits bistability through discrete jumps at length ratios of 1.3 and 1.8. Further simulation near these length ratios would likely yield a second stable transmission branch. The transmission at the third harmonic frequency shows a much more complicated response to film thickness than at the incident frequency. At length ratios of 1.1 and 1.6, transmission sharply peaks, whereas the corresponding transmission at the incident frequency is near minimum. Two smaller regions of increased third harmonic generation occur at length ratios from 1.3-1.4 and 1.75-1.85.

As in the first simulation, for both the incident and third harmonic light, the transmission of the array 100 substantially agrees with the mapping to the transmission of the effective dielectric slab. Slight differences in the final calculations are a result of the fundamental assumption that array 100 experiences deep subwavelength resonance. For larger $\lambda/d$, this error would be reduced. Thus, the second simulation establishes that array 100 acts as a uniform dielectric slab with an index of refraction of 12 and nonlinear index of 0.01, which results in an overall increase of 8 in the index of refraction and an increase of 4096 in the third-order nonlinear coefficient of dielectric element 114.

The third simulation of the mapping between array 100 and the effective dielectric slab demonstrated transmission exhibiting bistability over a range of intensities at normal incidence to film 102. Both array 100 and the effective dielectric slab were expected to display two distinct regions of stable transmission. In this simulation, array 100 had the following parameters: $\lambda=8$, $d/a=4$, $n_o=1.5$, $a=0.1$, $\lambda/d=20$, $L=64/3$, and $\chi^{(3)}=3.9\times 10^{-5}$ (note these are in scale invariant units). Using the mapping from the above equations, the effective slab had the following parameters: $\lambda=8$, $\overline{\in}_f=36$, $\overline{L}=16/3$, and $\overline{\chi}^{(3)}=0.01$.

Figure 9:
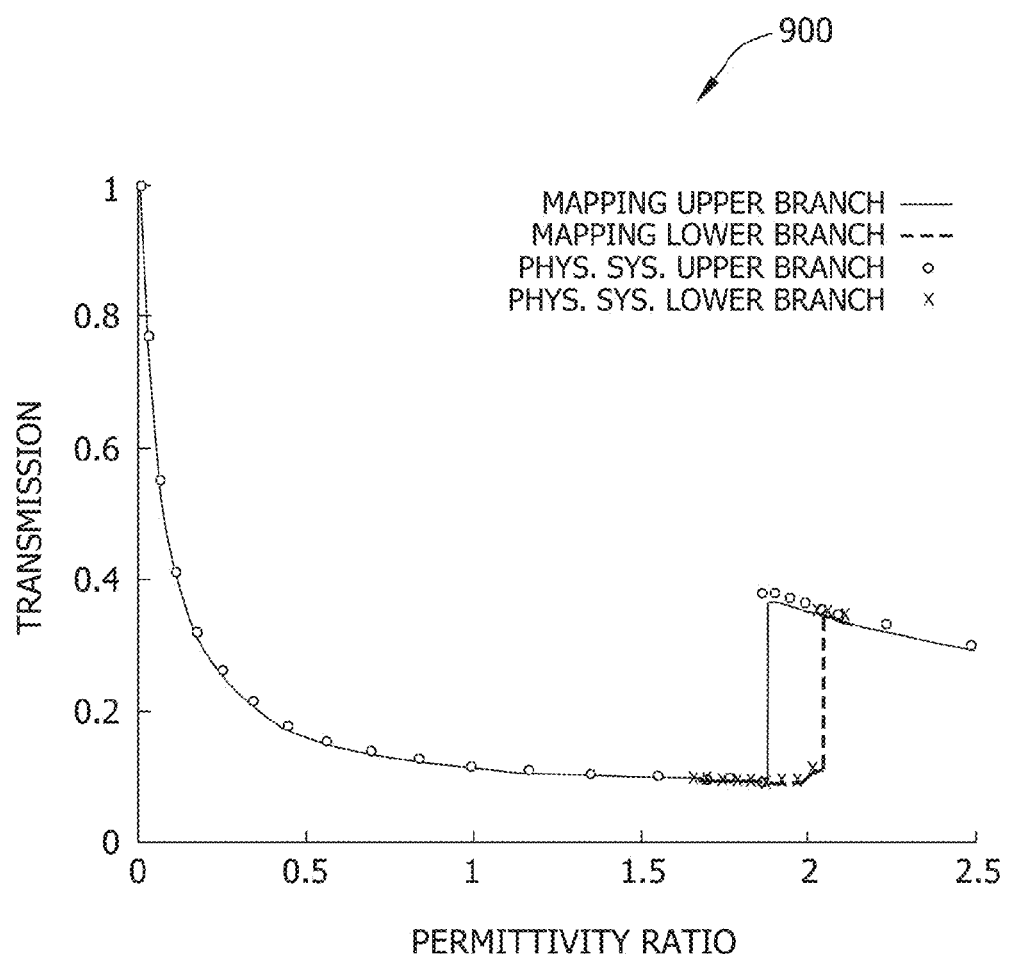
FIG. 9 is a graph illustrating total transmission of light versus a permittivity ratio.

FIG. 9 is a graph 900 illustrating total transmission of light versus the permittivity ratio. The total transmission was quantified using the transmission coefficient, defined as follows in Equation (1):

$$T_{TOTAL} = \frac{\sum |E_{i\times\omega}|^2}{|E_0|^2}. \quad (1)$$

To calculate the upper branch of the bistability curve, the intensity of the plane-wave source increased from zero to a steady-state value. This is essentially the same as the previous two simulations, except that there was a slower rise in the steady-state intensity. To calculate the upper branch, a plane-wave source at a steady-state intensity was raised to twice its value using a temporal Gaussian pulse with the peak intensity occurring at the frequency of interest. Using this source, the temporal Gaussian pulse pushed film 102 into a higher-intensity region of single-valued transmission beyond the bistable region. Through the pulse decay, the film fell back into the region of bistability at a steady-state intensity of interest. However, having "remembered" coming from a region of higher intensity, through nonlinear optical processes, the transmission jumped down to the lower branch. Using both sources, the lower and upper branches of bistability were successfully demonstrated.

In graph 900, the points represent the calculated total transmission of the upper branch of array 100 using the single plane-wave source, while the crosses represent the calculated total transmission of the lower branch of array 100 using the dual plane-wave, Gaussian pulsed source. The solid line represents the calculated total transmission of the upper branch of the effective dielectric slab, and the dashed line represents the calculated total transmission of the lower branch of the effective dielectric slab.

In graph 900, the total transmission is single-valued for permittivity ratios from 0 to 1.8. This is confirmed for both the single plane-wave and the dual plane-wave, Gaussian pulsed source, as both resulted in the same total transmission response. At 1.85, the total transmission jumps from 0.10 to 0.40 when the intensity is raised from zero, hence marking the beginning of the upper branch. However, when the intensity is increased past 2.10 and lowered back to 1.85, the total transmission does not jump, hence marking the beginning of the lower branch. At 2.10, the total transmission of the lower branch jumps from 0.15 to 0.35. Past 2.10, the total transmission becomes single-valued again, as confirmed for both the single plane-wave and the dual plane-wave, Gaussian pulsed source, as both resulted in the same total transmission response. Given these properties, the bistability region is referred to as clockwise, as the intensity profile follows a clockwise path to produce a full bistability curve.

The total transmission of array 100 agrees with the mapping to the total transmission of the effective dielectric slab. Slight differences in the final calculations are a result of the fundamental assumption that array 100 experiences deep subwavelength resonance. For larger $\lambda/d$, this error would be reduced. Thus, the third simulation establishes that array 100 acts as a uniform dielectric slab with an index of refraction of 6 and nonlinear index of 0.01, which results in an overall increase of 4 in the index of refraction and an increase of 256 in the third-order nonlinear coefficient of dielectric element 114.

Figure 10:
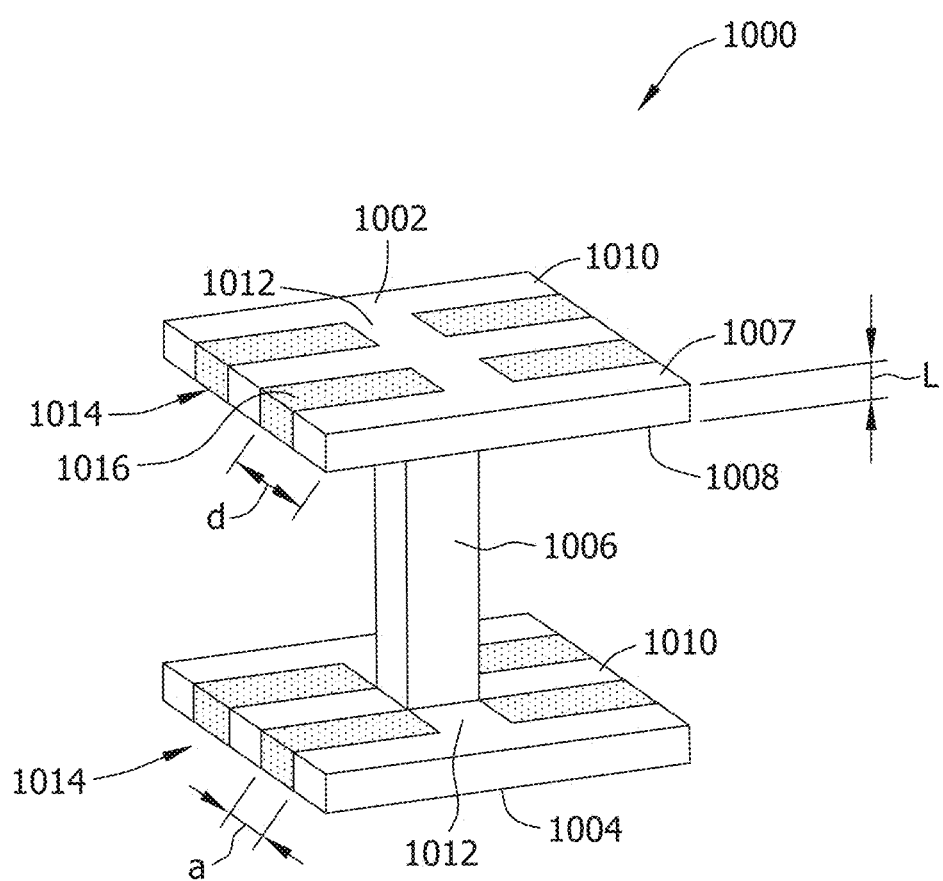
FIG. 10 is a three-dimensional structure that has an enhanced nonlinear response to light.

FIG. 10 is a three-dimensional structure 1000 that has an enhanced nonlinear response to light. Structure 1000 includes a first plate 1002 and an opposite second plate 1004 that are coupled to one another by a shaft 1006. First plate 1002 and second plate 1004 are substantially parallel to one another, and shaft 1006 is substantially orthogonal to plates 1002 and 1004. Plates 1002 and 1004 each have a first surface 1007, an opposite second surface 1008, and a thickness L. Plates 1002 and 1004 each include a plurality of substantially parallel arms 1010 extending from a crossbeam 1012. A plurality of slits 1014 are formed between arms 1010 and extending from first surface 1007 to second surface 1008.

In the embodiment shown in FIG. 10, plates 1002 and 1004 each include six arms 1010 and four slits 1014. However, plates 1002 and 1004 may include any number of arms 1010 and/or slits 1014 that enable structure 1000 to function as described herein. Similar to slits 108, slits 1014 have a width, a, and a periodicity, d. In structure 1000, each slit 1014 includes a dielectric element 1016 positioned in slit 1014.

Similar to film 102, plates 1002 and 1004 are composed of a metallic material. For example, plates 1002 and 1004 may be composed of silver, gold, aluminum, and/or any other suitable material having a thickness greater than a skin depth of the material. Dielectric elements 1016 may be composed of fused silica having a nonlinear index of $3 \times 10^{-16}$ cm$^2$/W. Plates 1002 and 1004 and dielectric elements 1016 exhibit an enhanced nonlinear response to light, similar to film 102 and dielectric elements 114. Accordingly, similar to array 100, the ratio of d to a can be manipulated in structure 1000 to alter the nonlinear response of structure 1000, similar to array 100.

Figure 11:
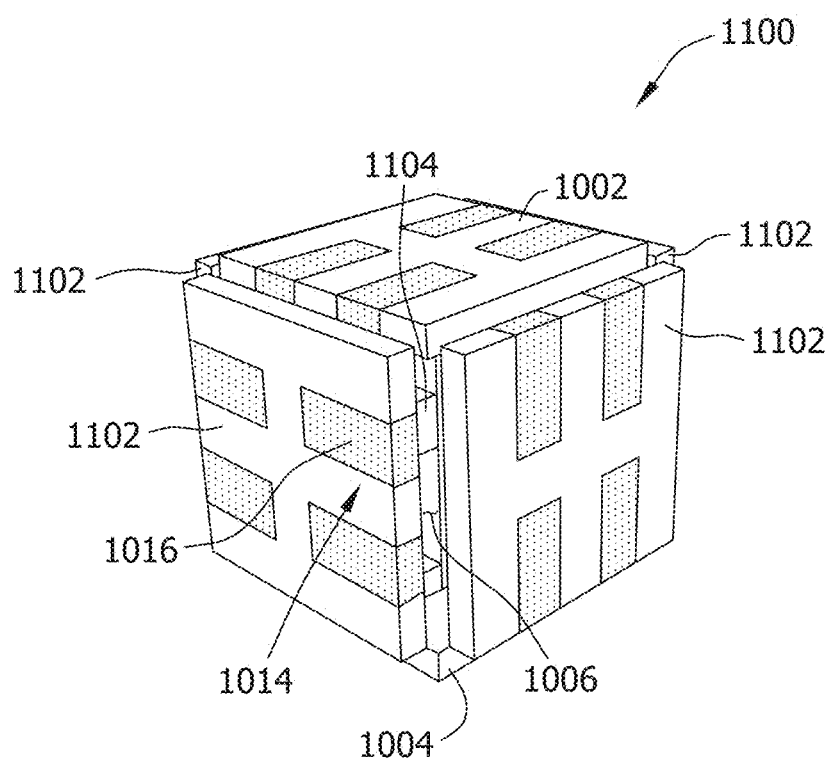
FIG. 11 is a three-dimensional cube that has an enhanced nonlinear response to light.

FIG. 11 is a three-dimensional cube 1100 having an enhanced nonlinear response to light. Cube 1100 may be formed by coupling additional plates 1102 to structure 1000, such that additional plates 1102 are substantially orthogonal to plates 1002 and 1004. Accordingly, first plate 1002, second plate 1004, and additional plates 1102 form the six faces of cube 1100.

Additional plates 1102 are substantially similar to plates 1002 and 1004 of structure 1000. That is, additional plates 1102 include dielectric elements 1016 positioned within slits 1014 in plates 1102. In the embodiment shown in FIG. 11, each additional plate 1102 is coupled to shaft 1006 by a member 1104. Alternatively, additional plates 1102 are coupled to structure 1000 by any means that enable cube 1100 to function as described herein. As the six faces of cube 1100 each include slits 1014 and dielectric elements 1016, to generate an enhanced nonlinear response, light can be transmitted towards cube 1100 from a variety of directions and/or angles.

Figure 12:
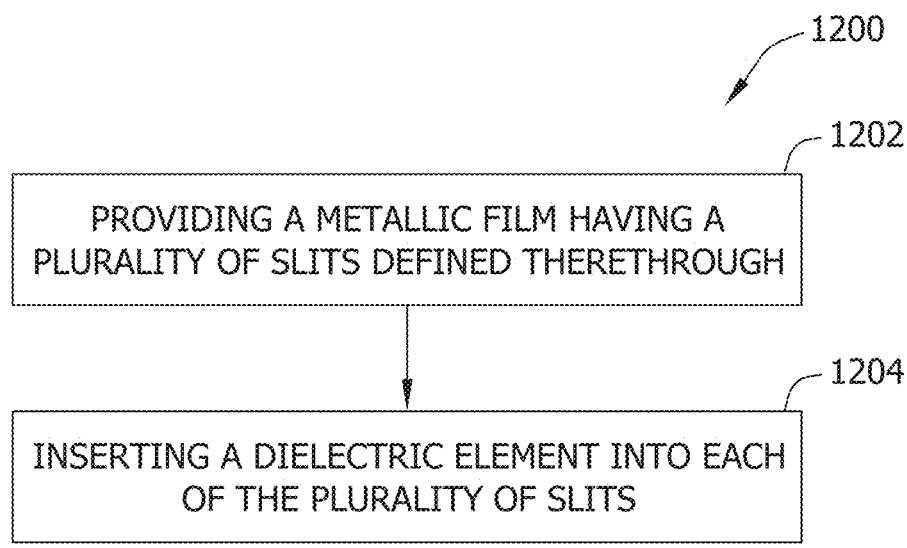
FIG. 12 is a flowchart of an exemplary method of assembling a metamaterial having an enhanced nonlinear response to light.

FIG. 12 is a flowchart of an exemplary method 1200 of assembling a metamaterial having an enhanced nonlinear response to light, such as array 100, structure 1000, and/or cube 1100. Method 1200 includes providing 1202 a metallic film having a plurality of slits defined therethrough, such as metallic film 102 and slits 108. The slits in the metallic film have a width a and a periodicity d. A plurality of dielectric elements, such as dielectric elements 114 are inserted 1204 into the slits. A relationship exists between a and d such that the metamaterial formed from the metallic film and the dielectric elements exhibits an enhanced nonlinear response to light that is transmitted through the slits in the metamaterial.

Validations

Rigorous numerical calculations of the far-field transmission for both the metal-dielectric grating and the general scaled mapping were performed. The electrodynamic calculations were processed using a finite-difference time-domain (FDTD) numerical method. The simulation used in all cases was MEEP. These examples demonstrate the enhancement of the grating and the robustness of the general scaled mapping through fundamental nonlinear optical phenomena, specifically harmonic generation in second-order and third-order nonlinear materials, and optical bistability. Reference slabs containing the nonlinear material within the grating were plotted to show the enhanced response of the grating. From the results of each case, the accuracy of the scaled mapping and the many orders of magnitude of enhancement of the grating for different grating thicknesses, periodicities, and intensities were established. Although the grating produces an enhancement for any suitable wavelength, the examples herein utilize the mid-infrared region of light at approximately 10.6 µm.

The first example is the enhancement of harmonic generation. For second-order non-linear materials, a harmonic at twice the input frequency is formed, and for third-order material, a harmonic at three times the input frequency is formed. Other higher harmonics are formed; however, these are much smaller compared to the second or third harmonics. To demonstrate second harmonic generation, we chose cuprous chloride (CuCl) as the second-order dielectric in the grating. At 10.6 µm, CuCl is assumed to have a linear permittivity $\epsilon_l=4$ and a second-order nonlinearity $\chi^{(2)}=6.7$ pm/V. For the grating to be subwavelength, the grating periodicity d=1.178 µm and the slit width a=0.147 µm. The film thickness L=10.6 µm for the grating to be near resonance. From the general scaled mapping, the grating acts as a homogeneous dielectric slab with enhanced linear permittivity of $\overline{\epsilon}_l=258$ and enhanced second order non-linearity $\overline{\chi}^{(2)}=3444$ pm/V at a slab thickness $\overline{L}=1.325$ µm. In particular, CuCl experiences an enhancement of 64.5 in linear relative permittivity and 514 in second-order susceptibility atop of its naturally occurring constituents.

Figure 13:
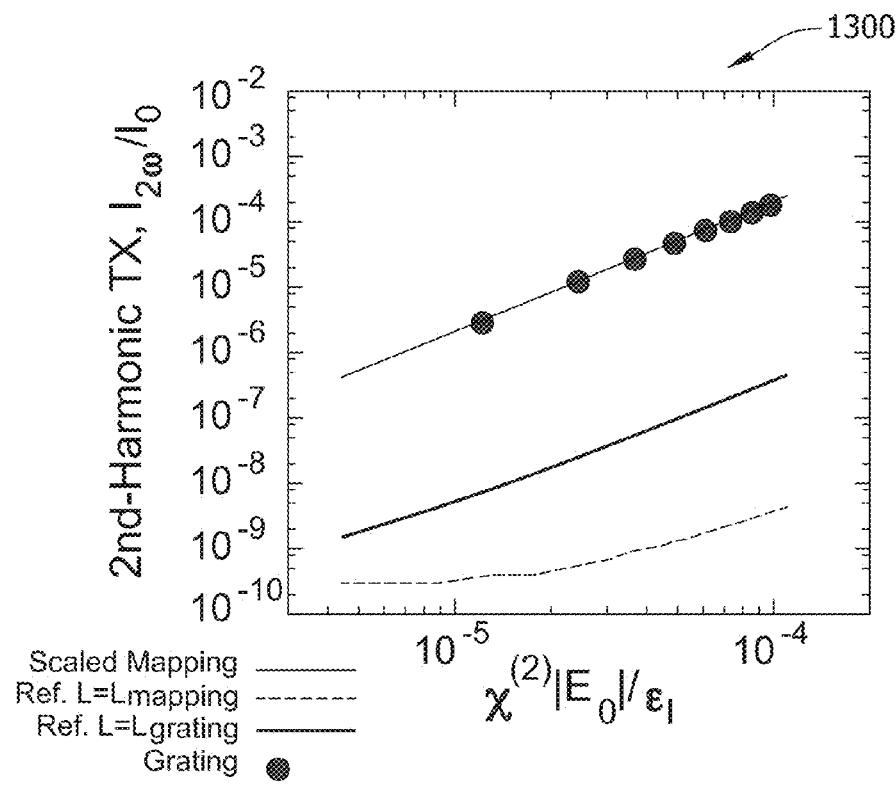
FIG. 13 is a graph of a second harmonic transmission of a grating designed for CuCl.

FIG. 13 shows a graph 1300 of the second harmonic transmission of the grating designed for CuCl and the homogeneous dielectric slab from the general scaled mapping for several input field strengths, $E_0$. The input field strength is presented as a ratio defined as $$\frac{\chi^{(2)}|E_0|}{\varepsilon_l}$$

for second order materials. This ratio scales the magnitude of the nonlinear part of the permittivity over the linear permittivity. When the ratio is less than one, the linear part of the permittivity dominates, whereas when the ratio is greater than one, the nonlinear part dominates. For all input fields, general scaled mapping fits extremely well with the metal-dielectric grating. This result confirms the scaled mapping analysis for gratings with second-order materials. Also, this result establishes the general scaled mapping as a predictive model for second harmonic generation in metal-dielectric gratings.

In addition, the nonlinear optical response of several uniform slabs containing CuCl at the same field inputs was calculated to verify the enhancement of the grating. To best illustrate the enhancement from the grating, three different film thicknesses were compared: when reference thickness is equal to the grating thickness, the mapped thickness, and on resonance. For the reference slab, the thickness of the grating and resonance condition are equivalent. For the field strengths used in FIG. 13, the ratio is relatively small. Under the low field input conditions, the second harmonic generation in both systems are in their beginning stages, where conversion efficiency is small. This is a good region to compare the optical response of the grating against the reference slab since this avoids areas of harmonic saturation. Because the conversion to second harmonic generation is linear at low field strength, greater than two orders of magnitude enhancement is clearly evident, and upholds the general scaled mapping prediction that the grating designed generates an enhancement of 514.

In demonstration of third harmonic generation, we chose gallium arsenide (GaAs) as the third-order dielectric in the grating. At 10.6 µm, GaAs is assumed to have a linear permittivity $\in_l=10.13$ and a third-order nonlinearity $\chi^{(3)}=0.120$ cm$^3$/erg. For the grating to be subwavelength, the grating periodicity d=0.8 µm and the slit width a=0.1 µm. The film thickness L=3.352 µm for the grating to be near resonance. From the general scaled mapping, the grating acts as a homogeneous dielectric slab with enhanced linear permittivity of $\overline{\in}_l=644$ and enhanced third order non-linearity $\overline{\chi}^{(3)}=491.5*10^{-10}$ cm$^3$/erg at a slab thickness $\overline{L}=0.419$ µm. In particular, GaAs experiences an enhancement of 64.4 in linear relative permittivity and 4096 in third-order susceptibility atop of its naturally occurring constituents.

Figure 14:
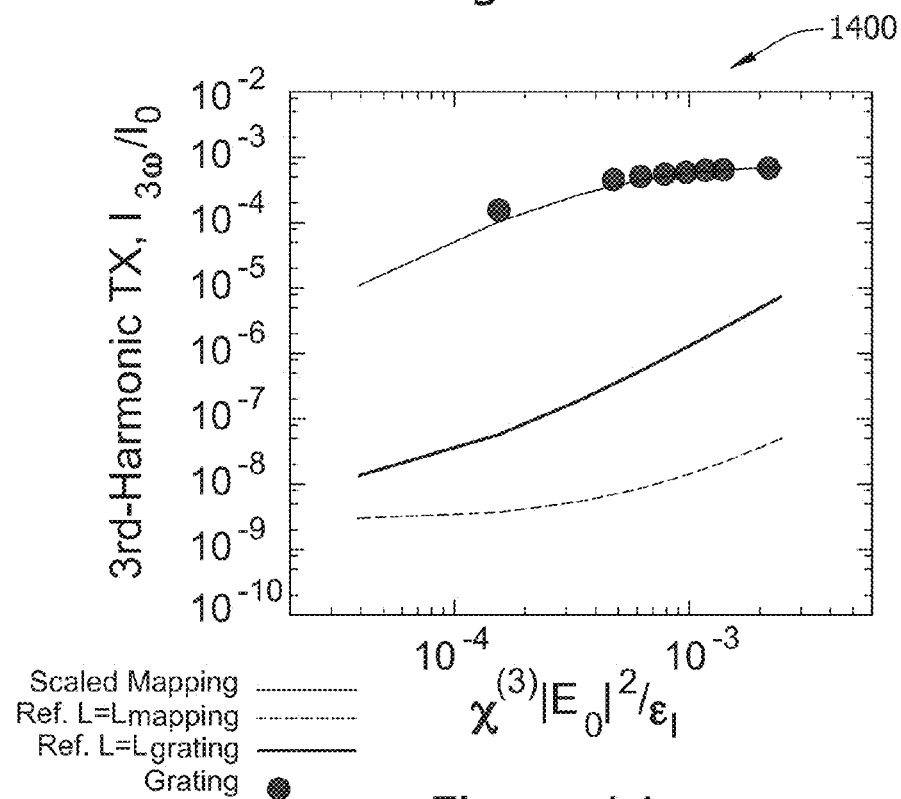
FIG. 14 shows a graph of a third harmonic transmission of a grating designed for GaAs.

FIG. 14 shows a graph 1400 of the third harmonic transmission of the grating designed for GaAs and the homogeneous dielectric slab from the general scaled mapping for several input field strength. The input field strength is presented as a ratio defined as $$\frac{\chi^{(3)}|E_0|^2}{\varepsilon_l}$$

for third-order materials. For all input fields, the general scaled mapping fits the metal-dielectric grating. This result confirms the scaled mapping analysis for gratings with third-order materials. Also, this result establishes the general scaled mapping as a predictive model for third harmonic generation in metal-dielectric gratings.

In addition the nonlinear optical response of several uniform slabs containing GaAs at the same field inputs was calculated to verify the enhancement of the grating. The same reference slab technique used in the previous validation was used. Also, for the reference slab, the thickness of the grating and resonance condition are equivalent. For the field strengths used in FIG. 14, the ratio is very small. For the smallest ratios shown, the third harmonic generation in both systems is in their beginning stages, where conversion efficiency is small. Because the conversion to third harmonic generation is linear at these low field strengths, three orders of magnitude enhancement is clearly evident, and upholds the general scaled mapping prediction that the grating designed generates an enhancement of 4096. For the larger ratios shown, the grating appears to plateau. This is a result of large modification of the total permittivity such that the transmission of the fundamental frequency is pushed off resonance. If the third harmonic efficiency, defined as $I_{3\omega}/I_\omega$, was shown, harmonic conversion would increase linearly, and thus, demonstrate the orders of magnitude enhancement against the reference slabs at these larger ratios.

The second validation is the enhancement of far-field optical bistability. For certain input field intensities, a nonlinear material can generate two distinct, stable output intensities, this is known as the bistability region. The output with the greater transmittance is the upper curve, whereas the lower transmittance is the lower curve. For counterclockwise bistability, the lower curve is reached when driven from intensities lower than the bistability region. Conversely, the upper curve is reached when driven from intensities higher than the bistability region. Because of this, the calculation of both branches of bistability requires added computation finesse. Discrete jumps in transmittance occur when passing through the bistability region from either high or low single-state intensities. These discrete jumps characterize the bistability region. In addition, optical bistability only occurs for specific film thicknesses in third-order nonlinear materials.

To demonstrate bistability, silicon (Si) was chosen as the third-order dielectric in the grating. At 10.6 µm, Si is assumed to have a linear permittivity $\in_l=12.094$ and a third-order nonlinearity $\chi^{(3)}=0.060*10^{-10}$ cm$^3$/erg. For the grating to be subwavelength, the grating periodicity d=0.884 µm and the slit width a=0.221 µm such that d/a=4. Because bistability occurs at a specific film thickness, the film thickness L=4.24 µm for the grating. At this film thickness, bistability occurs for the metal-dielectric grating. From the general scaled mapping, the grating acts as a homogeneous dielectric slab with enhanced linear permittivity of $\overline{\in}_l=194.75$ and enhanced third order non-linearity $\overline{\chi}^{(3)}=15.36*10^{-10}$ cm$^3$/erg at a slab thickness $\overline{L}=1.06$ µm. In particular, Si experiences an enhancement of 16.1 in linear relative permittivity and 256 in third-order susceptibility atop of its naturally occurring constituents.

Figure 15:
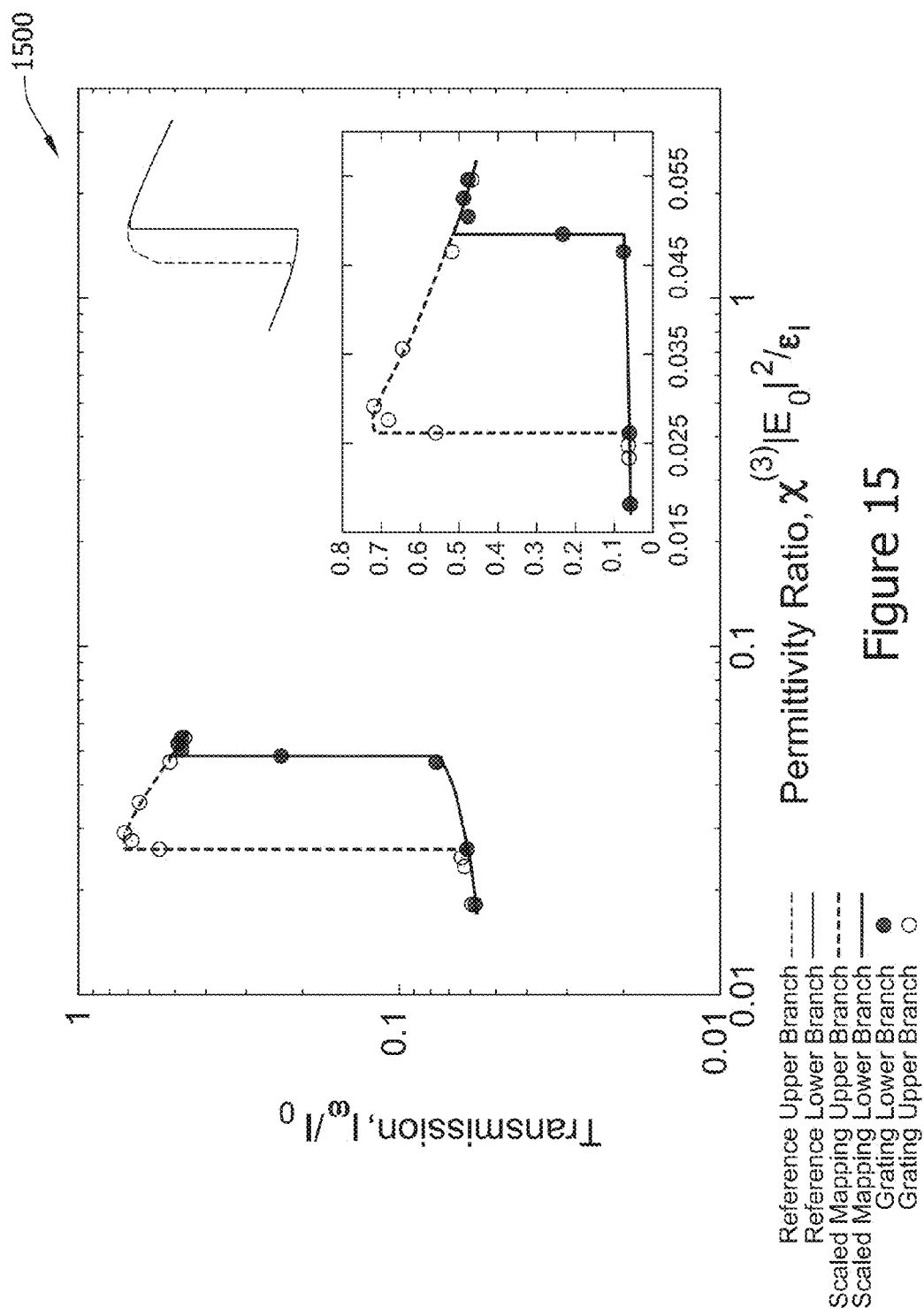
FIG. 15 shows a graph of a bistability curve of a metal-dielectric grating containing Si.

FIG. 15 shows a graph 1500 of the bistability curve of the metal-dielectric grating containing Si and the homogeneous dielectric slab from the general scaled mapping for several input field strengths. For all input fields, the general scaled mapping fits with the metal-dielectric grating. The scaled mapping not only predicts the correct bistable branch transmissions, but also the specific input field intensities at which the bistability region occurs, which is important in the measurement and design of bistability in devices utilizing the phenomena. This result confirms the scaled mapping analysis for gratings with third-order materials in bistability. Also, this result establishes the general scaled mapping as a predictive model for bistability in metal-dielectric gratings.

In addition, the bistability of a uniform slab containing Si at the same field inputs was calculated to verify the enhancement of the grating. To be consistent, the reference slab thickness was chosen to be near the first onset of bistability to match the conditions of the grating. In FIG. 15, the metal-dielectric grating shows bistability at much lower intensities relative to the reference slab. In particular, the bistability region of the grating occurs two orders of magnitude sooner than the reference slab. This result upholds the general scaled mapping prediction that the grating designed generates an enhancement of 256. For fixed d/a, the intensities in bistability region of the grating can be lowered with small increases in film thickness, to further lower its onset. Also, increasing d/a would further lower the onset of bistability. This result is crucial for low-powered devices utilizing optical computation.

The last validation is the enhancement of far-field second harmonic generation gratings containing a lossy metal. To demonstrate this, silver was chosen for the metal gratings.

For consistency with the previous validations, the same second-order nonlinear material, cuprous chloride (CuCl) at 10.6 µm, was used. Designing the grating to be subwavelength, the grating periodicity d=5.3 µm and the slit width a=1.325 µm, such that d/a=4. The film thickness L=2.49 µm for the grating to be near resonance. Since the scaled mapping does not involve lossy metals, no scaled mapping is demonstrated herein. However, using it as a guide for the level of enhancement, it is expected that two-orders of magnitude of enhancement should be observed for the chosen parameters.

Figure 16:
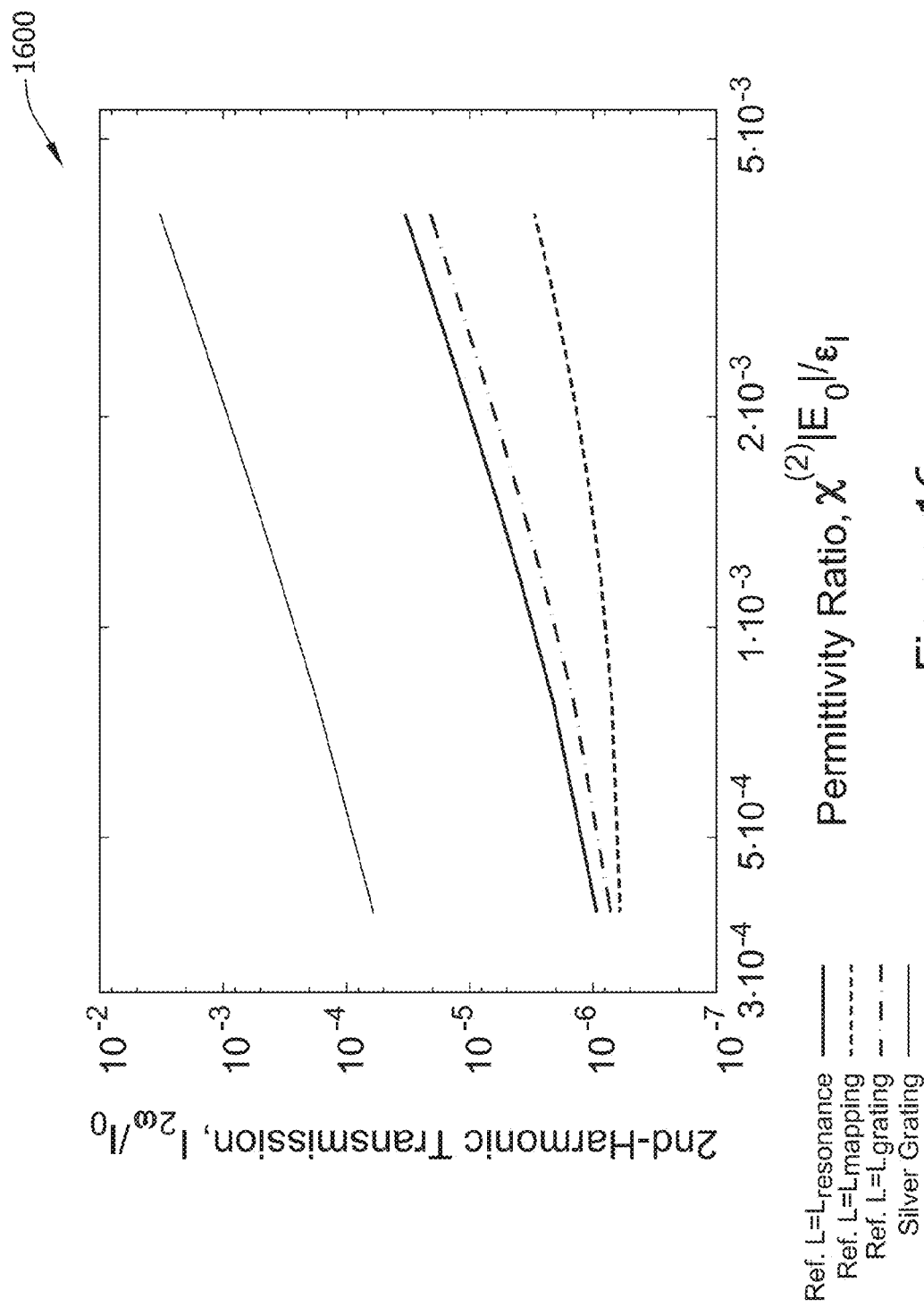
FIG. 16 shows a graph of second harmonic generation of a grating with silver and CuCl.

FIG. 16 shows a graph 1600 of the second harmonic generation of the grating with silver and CuCl. At the same field inputs, reference slabs containing CuCl at the three previously proposed thicknesses were also analyzed. Under the low field input conditions, the second harmonic generation in both systems is in their beginning stages, where conversion efficiency is small. Because the conversion to second harmonic generation is linear at low field strength, two orders of magnitude enhancement is evident, even with losses from silver gratings. For materials at longer wavelengths, losses from metal will diminish, where as shorter wavelengths will reduced the effectiveness of metal due to larger field penetration into the metal. Overall, this result demonstrates the enhancement of nonlinear materials and justifies previous assumptions.

The metamaterials described herein (e.g., array 100 shown in FIG. 1, structure 1000 shown in FIG. 10, and cube 1100 shown in FIG. 11), in addition to having an enhanced nonlinearity, are also capable of operating in a low-Q regime. In the low-Q regime, a cavity effect is minimized to yield relatively short intrinsic temporal response times, which may be as short as a few picoseconds.

For example, in one numerical simulation demonstrating second harmonic generation, for an array 100 with a=0.165 µm, d=1.325 µm (d/a=8), and L=11.2 µm, the Q-factor was 180. In another numerical simulation demonstrating third harmonic generation, for an array 100 with a=0.294 µm, d=1.767 µm (d/a=6), and L=2.648 µm, the Q-factor was 38. Further, a quality-factor value for the metal-dielectric grating containing Si (discussed above in relation to FIG. 15) at resonance was 380 (i.e., Q=380).

From numerical simulation, it was also observed that a bistability of the metamaterials described herein may be switched between high and low states within ~30 optical cycles, which corresponds to a switching time of approximately 1 picosecond. Accordingly, by operating at a low-Q regime, a temporal response of the metamaterials described herein may be as short as a few picoseconds.

The metamaterials described herein may be implemented in imaging systems. By using a subwavelength metal dielectric grating, optical resolution beyond a diffraction limit may be achieved. Specifically, a metal dielectric grating, such as array 100 (shown in FIG. 1), functions as a metalens. Metalens may also be referred to as an array of correlated nano-torches (CNTs).

Figure 17:
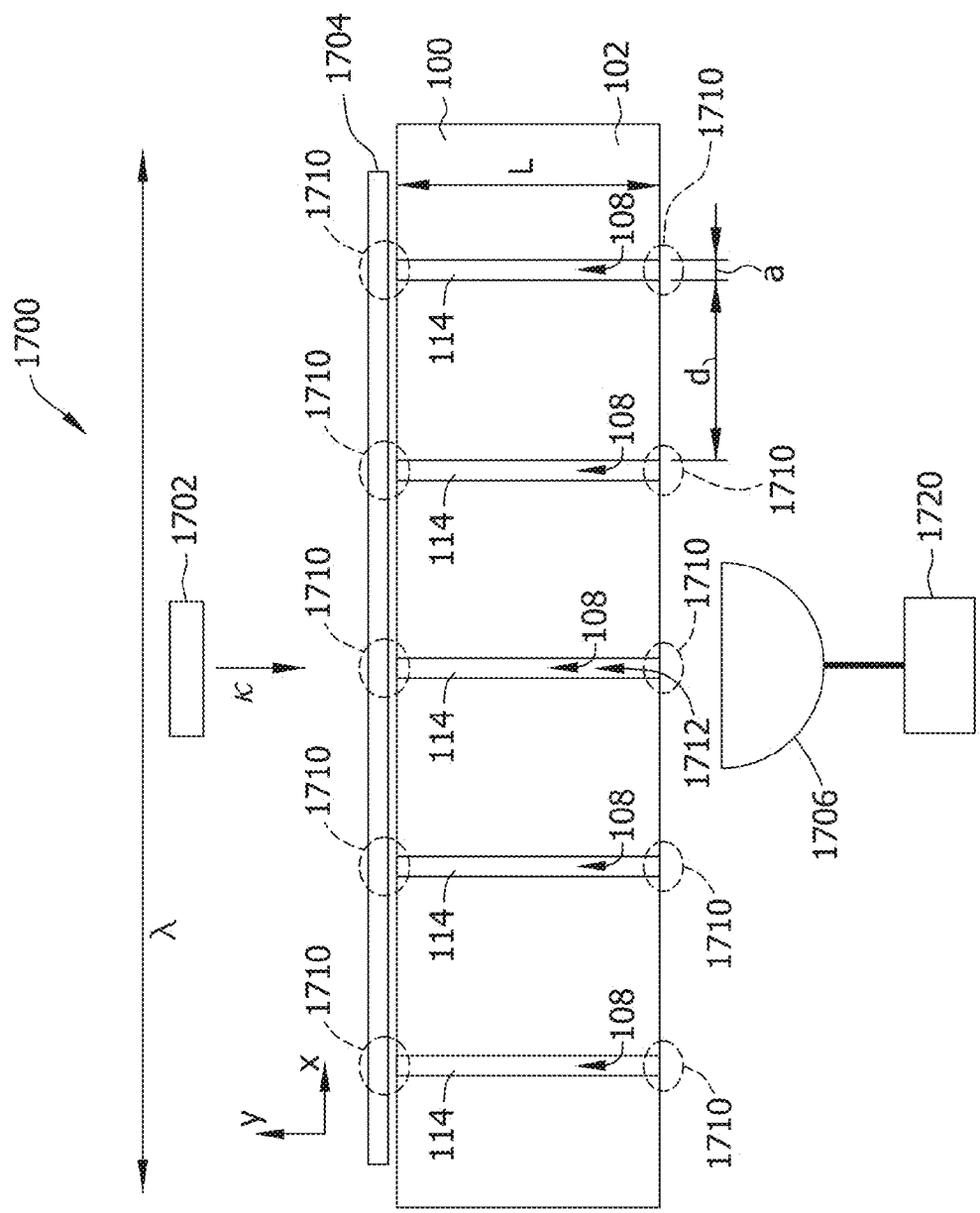
FIG. 17 is a schematic diagram of an imaging system.

FIG. 17 is a schematic diagram of an imaging system 1700 that includes array 100, which is also referred to herein as a metalens 100. Metalens 100 has a resolution that is independent of an operating wavelength. Instead, the resolution is determined by the dielectric slit width, a. Accordingly, the resolution may be orders of magnitude smaller than the incident light wavelength, $\lambda$. In a transmission mode, system 1700 operates with a relatively large transmitted signal, enabling far-field measurements. Further, by scaling dimensions of system 1700, a wavelength to resolution ratio can be maintained through the optical to near-infrared regime.

System 1700 includes a light source 1702 that emits light having wavelength $\lambda$ in a k direction towards metalens 100. In the exemplary embodiment, wavelength $\lambda$ is significantly larger than slit width a. An object 1704 to be imaged is positioned between light source 1702 and metalens 100. One or more detectors 1706 are positioned on an opposite side of metalens 100 from object 1704. Detector 1706 detects light transmitted through metalens 100 to facilitate imaging object 1704.

In system 1700, the field strength in the dielectric slits 108 is enhanced, instead of suppressed, by the narrow slit width a. To reconstruct an image of object 1704, an algorithm is used, as described herein. Using system 1700, in one embodiment, for a wavelength of $\lambda$=2.08 micrometers (µm), a resolution of 40 nm (~$\lambda$/50) may be achieved. Such a relatively large wavelength to resolution ratio may be maintained in the entire optical spectrum range, and can be adjusted relatively easily by changing dimensions of metalens 100 with respect to changes in wavelength $\lambda$. By exploiting the relatively large transmitted signal from metalens 100, near-field information may be encoded into the propagating wave by coupling to a passive waveguide.

Metalens 100 includes film 102 with subwavelength periodic cut-through slits 108. In the exemplary embodiment, slits 108 are filled with dielectric elements 114, as described above in reference to FIG. 1. Dielectric elements 114 may be located within slits 108 using a multi-layer manufacturing process, in which alternating layers of film 102 and dielectric elements 114 are formed on top of one another. Alternatively, dielectric elements 114 may be positioned within slits 108 using any other suitable technique (e.g., implanting or injecting dielectric elements 114 into formed slits 108). For imaging purposes, dielectric elements 114 are composed of substantially optically transparent dielectric materials. Alternatively, slits 108 may be empty (i.e., unfilled). Slit width a and periodicity d are both in the subwavelength regime (i.e., a<d<$\lambda$). Slits 108 extend through metalens 100 in a direction substantially parallel to a direction in which the incident light is emitted from light source 1702. Periodic slits 108 enable simultaneous multi-channel scanning, resulting in relatively fast image acquisition.

As explained above, metalens 100 exhibits artificial dielectric behaviors (e.g., enhanced non-linearity), and can be precisely mapped into a homogeneous dielectric slab, showing a Fabry-Perot transmission spectrum. At resonant frequencies, metalens 100 permits an extraordinary transmission for a TE incoming wave (i.e., a wave with a transverse electric field in the x direction). This transmission may potentially increase the signal-to-noise ratio (SNR) for certain external noises. The extraordinary transmission results from the subwavelength periodic structure, and cannot be achieved using only a single slit. Metalens 100 may also be operated in an absorption mode.

Moreover, the electric fields in silts 108 are greatly enhanced (for a perfect electric conductor, the enhancement factor is d/a), and strong evanescent bulges 1710 are formed at both ends of slits 108, enhancing light-matter interactions. The size of bulges 1710 is defined as the full width at half maximum (FWHM) as compared with the electric field in slits 108. Numerically, the size of bulges 1710 is on the same order as slit width a. As explained above, the lateral resolution of an image produced using system 1700 is determined by slit width a, and may be one or two orders of magnitude smaller than the wavelength $\lambda$ of the incident illuminating light. For example the resolution may be at least a factor of two smaller than the wavelength λ of the incident illuminating light.

To image object 1704, object 1704 is placed on the same side of metalens 100 as light source 1702 such that object 1704 interacts with bulges 1710 on that side of metalens 100. Detector 1706 is placed on the opposite side of metalens 100 and positioned in proximity of single slit 108, referred to herein as a detection slit 1712. Detector 1706 measures the output optical flux, and accordingly the electric field strength, from detection slit 1712. Detector 1706 may be, for example, a photodetector. In the embodiment shown in FIG. 17, only one detector 1706 is shown. However, in some embodiments, system 1700 includes a plurality of detectors 1706, increasing a speed at which object 1704 may be imaged. Further, in some embodiments, system 1700 includes one or more optical fibers (not shown) that facilitating imaging by collect light passing through metalens 100.

Notably, slits 108 are coupled such that when one slit 108 is covered by object 1704, the field strengths in neighboring slits 108 are modified as well. Accordingly, each measurement by detector 1706 includes the information of the local optical properties of every periodic portion of object 1704 that covers a slit 108. Detector 1706 is communicatively coupled to a computing device 1720. Computing device 1720 reconstructs images of object 1704 based on the measurements acquired by detector 1706, as described herein.

Figure 18:
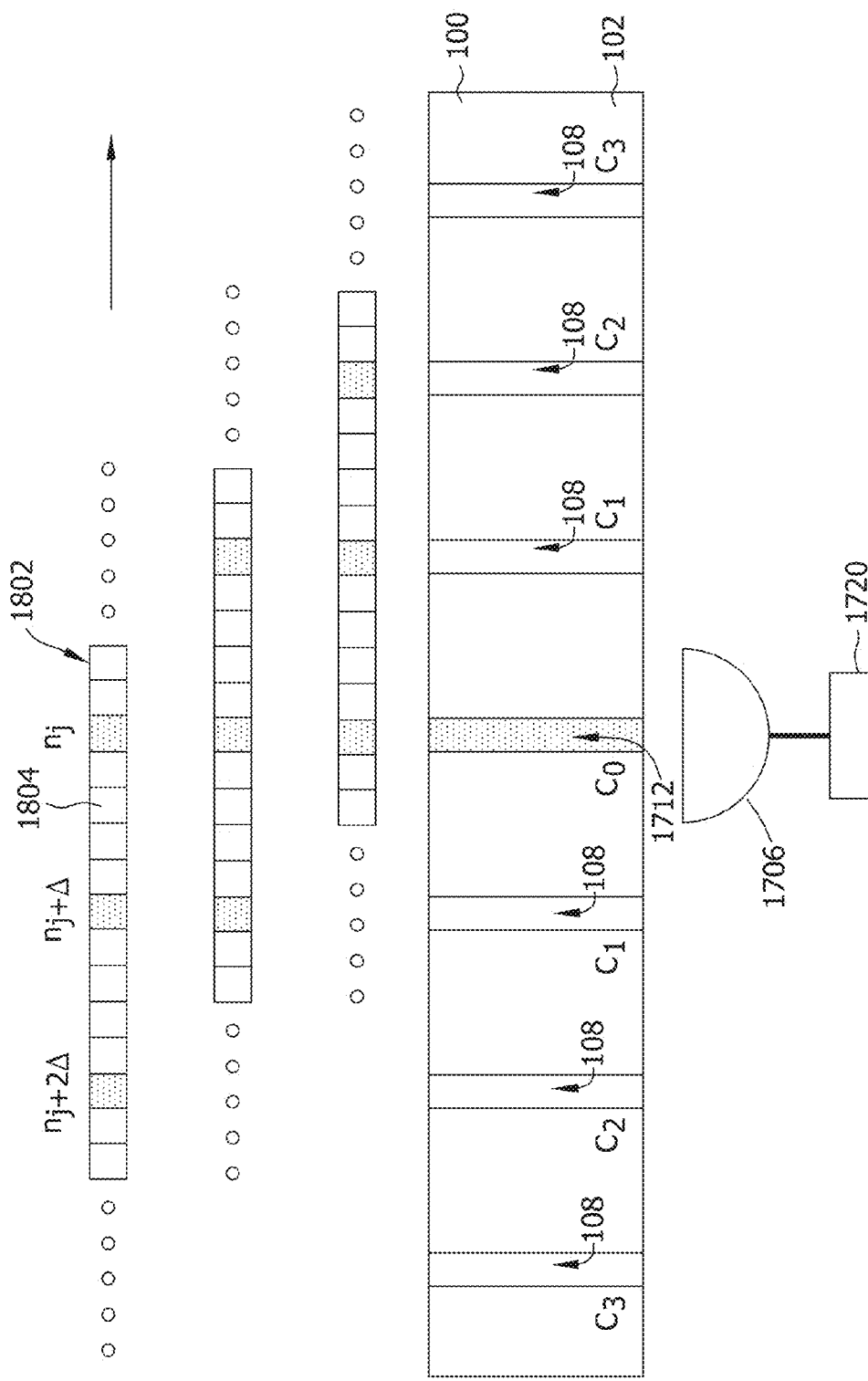
FIG. 18 is a schematic diagram for explaining data acquisition and image reconstruction in the system shown in FIG. 17.

FIG. 18 is a schematic diagram for explaining data acquisition and image reconstruction using system 1700. Assume object 1704 has an unknown refractive index profile n(x) which is to be determined using system 1700. The following describes determining n(x) over a continuous segment 1802 of object 1704 with a length Nd, where N is an arbitrary integer. Further, the refractive index of object 1704 outside of segment 1802 is assumed to a uniform index $n_b$.

Initially, a step size δ that specifies a pixel size in the image that will be reconstructed using system 1700 is selected. The imaging resolution is the greater of slit width a and step size δ. Segment 1802 is mathematically divided into NΔ slices 1804, where Δ=d/δ. In the exemplary embodiment, metalens 100 is dimensioned such that δ=a and Δ is an integer. Accordingly, the width of each slice is a. Slices 1804 are indexed uniformly by $n_i$ for i=1, 2, ... NΔ. Slices 1804 are indexed from right to left as shown in FIG. 18.

Detector 1706 detects a first measurement $E_1$ with segment 1802 positioned such that slice $n_1$ covers detection slit 1712. Notably, slices $n_{1+\Delta}$, $n_{1+2\Delta}$, ..., $n_{1+(N-1)\Delta}$ also cover slits 108 when slice $n_1$ covers detection slit 1712. The slices 1804 covering slits 108 form a set $S_1$.

After first measurement $E_1$ is detected and recorded, object 1704 is shifted relative to metalens 100 by δ in the x direction. Accordingly, slice $n_2$ now covers detection slit 1712, and slices $n_{2+\Delta}$, $n_{2+2\Delta}$, ..., $n_{2+(N-1)\Delta}$ cover other slits 108. These slices 1804 form a set $S_2$, and detector 1706 detects a second measurement $E_2$.

Shifting object 1704 and acquiring data is repeated until slice $n_{N\Delta}$ covers detection slit 1712 and measurement $E_{N\Delta}$ is recorded. In the exemplary embodiment, object 1704 is moved past metalens 100 at a substantially constant velocity, and measurements are recorded when slices 1804 align with slits 108. For example, object 1704 may be carried by a fluid that flows past object 1704 at a substantially constant velocity. In some embodiments, measurements are taken at a higher frequency (i.e., more often than only when slices 1804 align with slits 108), and those measurements taken when slices 1804 align with slits 108 are extracted from the remaining measurements for use in image reconstruction. The extraction may be performed, for example, using data masking. In an alternative embodiment, object 1704 does not move past metalens 100 at a constant speed, but is repeatedly shifted and stopped at appropriate positions.

The NΔ measurements (i.e., $E_1$, $E_2$, ..., $E_{N\Delta}$) can be partitioned into Δ groups according to their respective slice set (i.e., $S_1$, $S_2$, ..., $S_\Delta$). Each group contains N measurements. To extract information about segment 1802 from the measurements, an inverse differential algorithm reconstructs an image of segment 1802 from measurements as described herein.

All of the measurements in each group are coupled. To extract n(x), it is assumed the segment 1802 being imaged is derived from a uniform material with index $n_b$, and a differential between measurements is compared. A total field differential introduced by the sample is a linear summation of the contributions from all slits 108, and each contribution is proportional to a local index variation at every slit 108. For example, the first measurement $E_j$ in the j-th group can be expressed as follows in Equation (2):

$$E_j = E_b + (n_j - n_b)C_0 E_{inc} + (n_{(j+\Delta)} - n_b)C_1 E_{inc} + (n_{(j+2\Delta)} - n_b) \\ C_2 E_{inc} + (n_{(j+3\Delta)} - n_b)C_2 E_{inc} + \ldots \quad (2)$$

In Equation (2), $E_{inc}$ is the electric field of the incoming light, $E_b$ is the field strength for a uniform sample with index $n_b$, and $C_1$, $C_2$, $C_3$, ... are dimensionless quantities that describe the self and mutual couplings between detection slit 1712 and neighboring slits 108, as shown in FIG. 2. The $C_i$'s can be either positive or negative. Within the j-th group, the N measurements can be recast into a compact matrix form as follows in Equation (3):

$$\begin{pmatrix} C_0 & C_1 & C_2 & \ldots & C_{N-1} \\ C_1 & C_0 & C_1 & \ldots & C_{N-2} \\ C_2 & C_1 & C_0 & \ldots & C_{N-3} \\ \vdots & \vdots & \vdots & \ddots & \vdots \\ C_{N-1} & C_{N-2} & C_{N-3} & \ldots & C_0 \end{pmatrix}_{N \times N} \begin{pmatrix} \Delta n_j \\ \Delta n_{(j+\Delta)} \\ \Delta n_{(j+2\Delta)} \\ \vdots \\ \Delta n_{(j+(N-1)\Delta)} \end{pmatrix}_{N \times 1} = \\ \begin{pmatrix} \Delta \tilde{E}_j \\ \Delta \tilde{E}_{(j+\Delta)} \\ \Delta \tilde{E}_{(j+2\Delta)} \\ \vdots \\ \Delta \tilde{E}_{(j+(N-1)\Delta)} \end{pmatrix}_{N \times 1} \quad (3)$$

In Equation (3), $\Delta \tilde{E}_j = (E_j - E_b)/E_{inc}$ and $\Delta n_j = n_j - n_b$. Repeating the process for all groups provides n(x) for the entire segment 1802. Notably, rescaling all $C_i$'s does not change a contrast of the reconstructed image. Moreover, in the exemplary embodiment, metalens 100 is design such that only the first few $C_i$'s contribute. Through numerical simulation, it has been established that selecting $n_b$ based upon knowledge of object 1704 significantly increases the accuracy of the generated image. Moreover, the algorithm is also robust for a relatively wide range of $n_b$.

Figure 19:
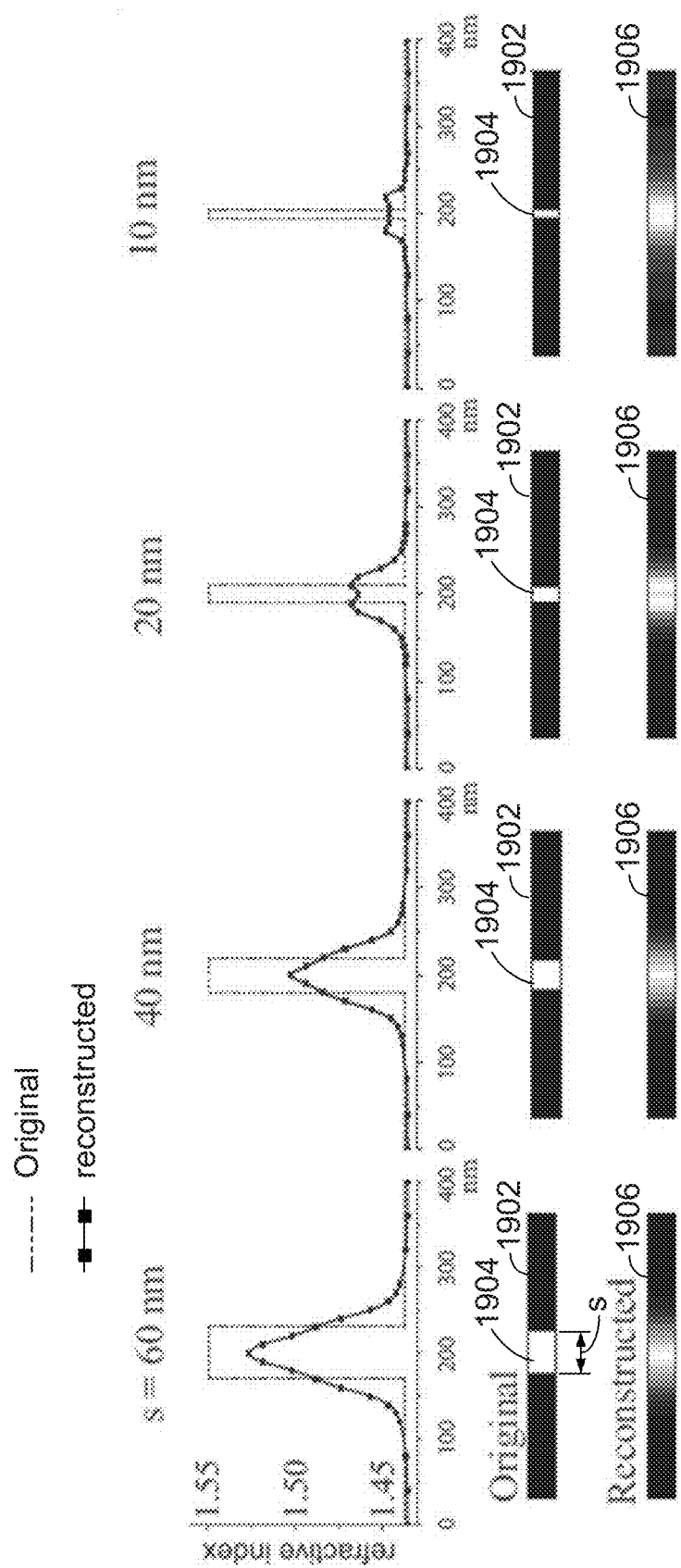
FIG. 19 shows experimental results obtained using the system shown in FIG. 17.

FIG. 19 shows experimental results obtained using system 1700 and the reconstruction algorithm described herein. For the results shown in FIG. 19, four samples 1902 of uniform silica (n=1.43869) each containing a single Barium crown glass defect 1904 (n=1.54893) were imaged. The thickness of each sample 1902 was 40 nm, and the wavelength of the incident light was 2.08 µm. Metalens 100 was made of silver (n=0.99886−14.128i) with slits 108 unfilled (i.e., empty), a periodicity of 400 nm, a slit width of 40 nm, and a length of 662 nm, such that metalens 100 was on resonance with the illuminating light. Numerically, for the example shown in FIG. 19, metalens 100 transmitted 66% of the incident light and reflects 3% of the incident light (the remaining light dissipated). $n_b$ was chosen to be the refractive index of silica.

The defect size, s, for the four samples 1902 was 60 nm, 40 nm, 20 nm, and 10 nm, respectively. A reconstructed image 1906 was generated for each sample 1902. In the graphs shown in FIG. 19, the dashed lines represent the original index profile, and the dots connected by solid lines represent the reconstructed index profile. Reconstructed images 1906 had FWHM of 70 nm, 62 nm, 58 nm, and 53 nm, respectively. For even smaller defects, the FWHM numerically approach the size of light bulge 1710, giving a point spread function (PSF) of system 1700.

As demonstrated in FIG. 19, system 1700 and metalens 100 can image a feature having a size smaller than slit width a, with the image blurred to have a size that is no less than slit width a. The kinks in the reconstructed profiles of the two larger samples 1902 and the peaks in reconstructed profiles of the two smaller samples 1902 are due to a relatively strong evanescent electric field in the y direction at corners of slits 108. If object 1704 is moved slightly away (e.g., approximately 10 nm) from metalens 100, these aberrations substantially disappear.

Figure 20:
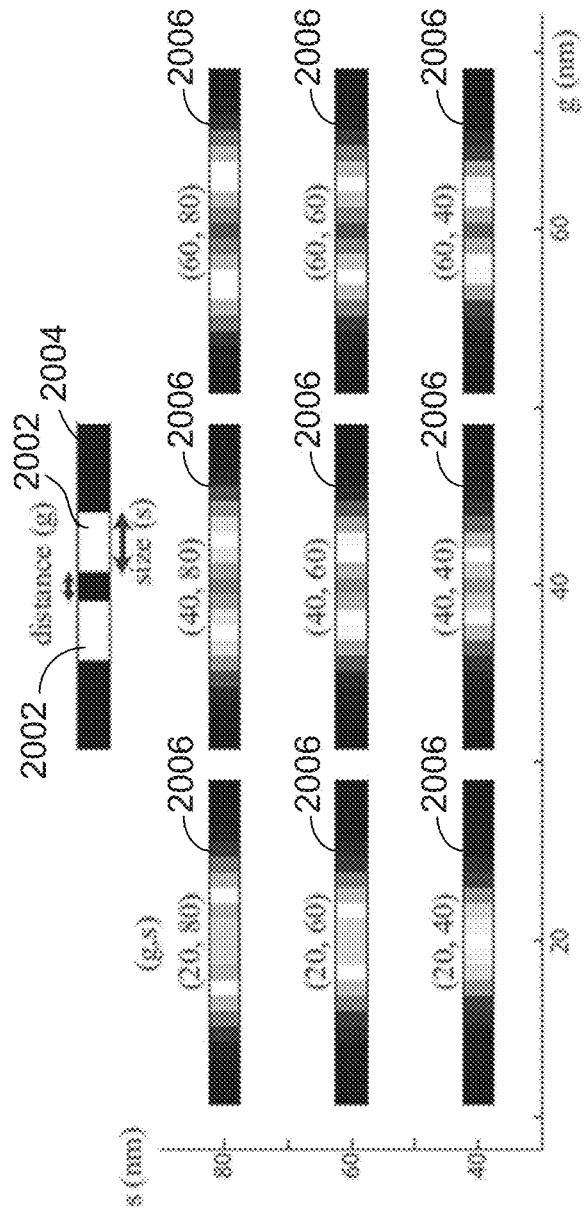
FIG. 20 shows experimental results obtained using the system shown in FIG. 17.

FIG. 20 shows experimental results obtained for attempting to distinguish a small distance, g, between two defects 2002 having size, s. Nine different samples 2004 with different combinations of distance g and size s were imaged to generate reconstructed images 2006. Samples 2004 were silica with Barium crown glass defects 2002. The thickness of each sample 2004 was 40 nm, and the wavelength of the incident light was 2.08 µm. Metalens 100 was made of silver with slits 108 unfilled, a periodicity of 400 nm, a slit width of 40 nm, and a length of 662 nm, such that metalens 100 was on resonance with the illuminating light.

As demonstrated in FIG. 20, when g was less than or equal to 40 nm, defects 2004 were distinguishable from one another, regardless of their size. Further, a relatively small distance (e.g., g=20 nm) between two relatively large defects (e.g., s=80, 60 nm) can be resolved by metalens 100. Such a case can be considered as complementary to a case where a relatively small defect is embedded in an otherwise homogeneous material. These results do not violate Abbe-Rayleigh criterion, which describes the resolving power between two point objects.

Referring back to FIG. 17, placing detector 1706 in a near field of metalens 100 perturbs measurements acquired by detector 1706 to some extent. However, accurate image reconstruction is still possible in system 1700, even in the presence of near field perturbation.

Figure 21:
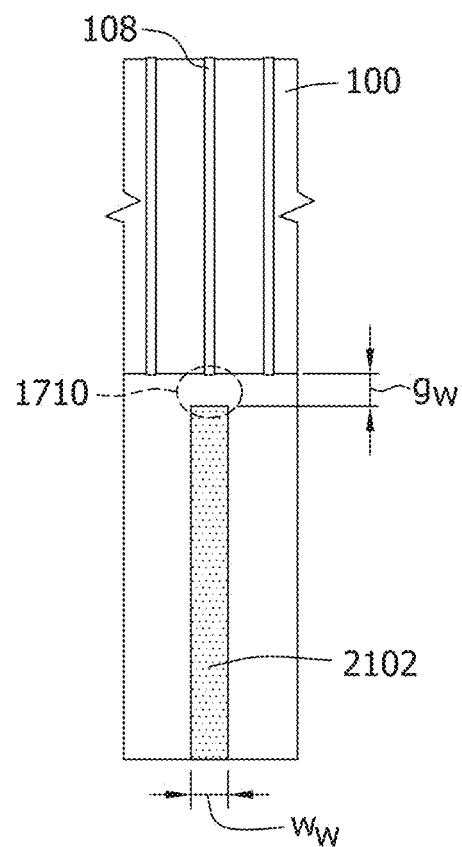
FIG. 21 is a schematic diagram of a waveguide that may be used with the system shown in FIG. 17.

FIG. 21 is a schematic diagram of a waveguide 2102 positioned behind metalens 100. Waveguide 2102 is positioned a distance, $g_w$, from slit 108 such that waveguide 2102 permeates a bulge 1710 associated with slit 108. Waveguide 2102 also has a width, $w_w$. Waveguide 2102 can perturb the strong evanescent field, and excite propagating waves inside waveguide 2102, which propagate through waveguide 2102 to be measured at an end of waveguide 2102 opposite bulge 1710.

Figure 22:
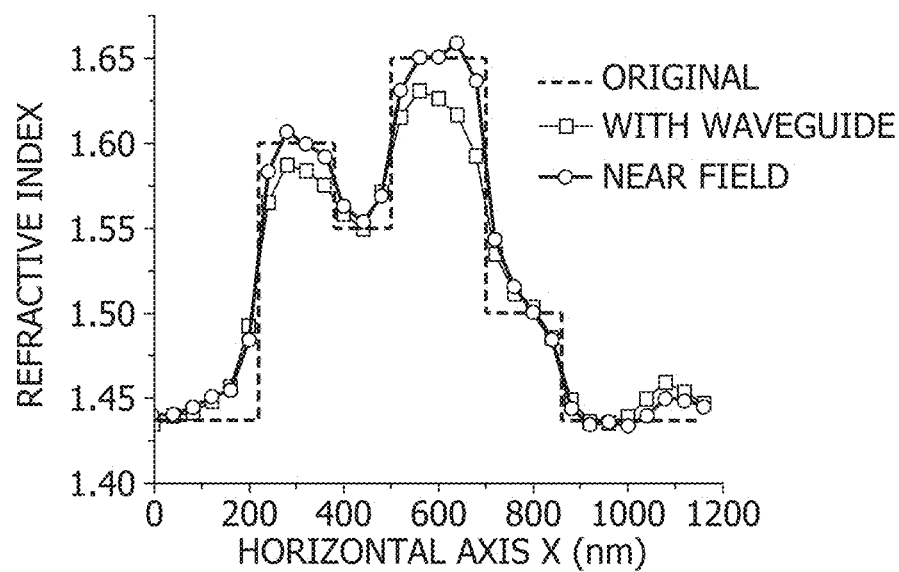
FIG. 22 shows experimental results obtained using the system shown in FIG. 17.

FIG. 22 is a graph demonstrating that the reconstructed images with and without waveguide 2102 for a 1.2 µm long object 1704 are substantially in agreement with the original index profile. In the exemplary embodiment, waveguide 2102 is made of silicon (n=3.44989) embedded in a silica substrate. Further, to facilitate maximizing a contrast to noise ratio, the width $w_w$ of waveguide 2102 is 250 nm and the distance $g_w$ is 210 nm in the exemplary embodiment. Alternatively, waveguide 2102 may have any composition and/or dimensions that enables waveguide 2102 to function as described herein. In the exemplary embodiment, as a result of the design, all $C_i$'s except $C_0$, $C_1$, and $C_2$ are equal to zero.

Figure 23:
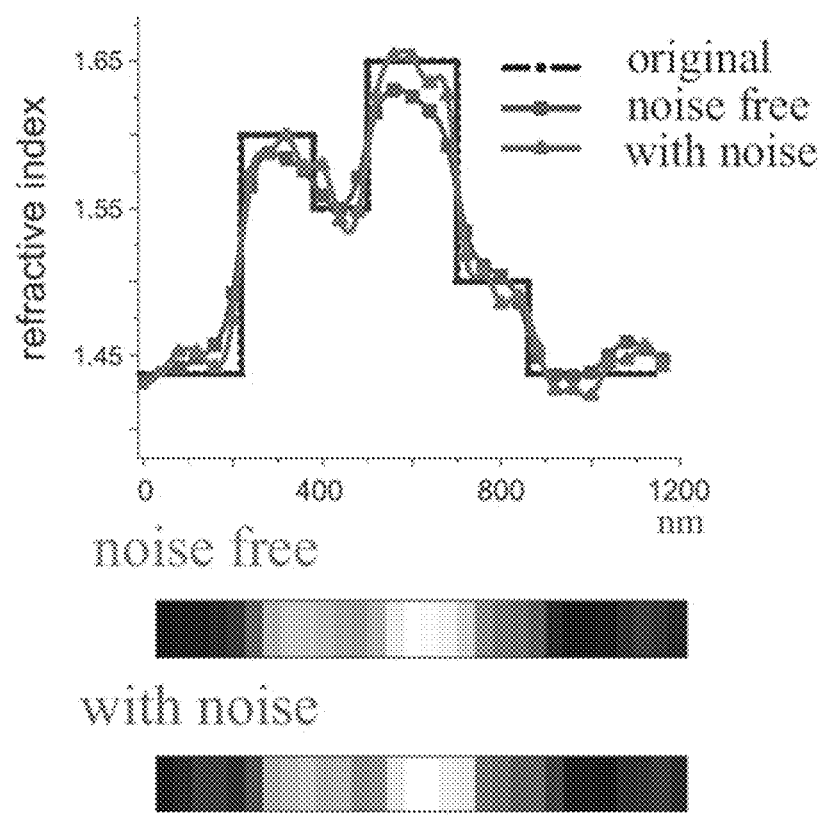
FIG. 23 shows experimental results obtained using the system shown in FIG. 17.

In imaging systems, noise may also contribute to a degradation in image quality. Accordingly, the robustness of metalens 100 against external random noise was evaluated. FIG. 23 shows experimental results for using system 1700 to reconstruct images with and without noise in the presence of waveguide 2102. Random noise was represented by 0.16%× I×$C_{Rand}$, wherein I is the intensity of the incident light, and $C_{Rand}$ is a random number in the set [−1, 1].

In most biological tissues, due to light scattering and absorption, optical properties are described by a spatially varying complex refractive index: ñ(x)=n(x)+ik(x). The correlations between slits 108 allow ñ(x) to be determined in one scanning using two detectors 1706. In such a situation, when one slit 108 is covered by object 1704 with a complex index, n(x) and k(x) contribute independently to the total measured differential field (in general, n(x) and k(x) give rise to two different sets of coupling constants $C_i$). By measuring at two neighboring slits 108 (or in general, any two correlated slits 108), ñ(x) can be determined by applying the reconstruction algorithm discussed herein. Reconstructing the complex index ñ(x) based on correlations is not possible without multiple slits 108.

Figure 24:
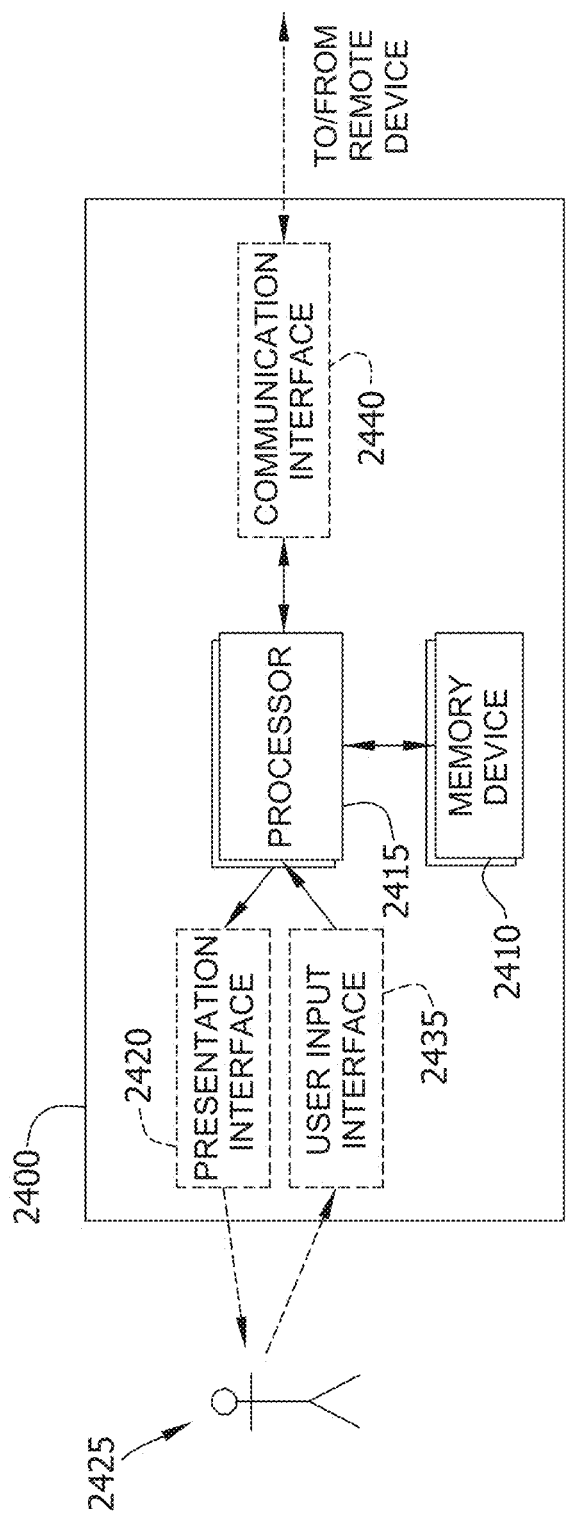
FIG. 24 is a block diagram of a computing device that may be used with the system shown in FIG. 17.

FIG. 24 is a block diagram of an exemplary computing device 2400, such as computing device 1720 (shown in FIGS. 17 and 18), that may be used with system 1700.

Computing device 2400 includes at least one memory device 2410 and a processor 2415 that is coupled to memory device 2410 for executing instructions. In some embodiments, executable instructions are stored in memory device 2410. In the exemplary embodiment, computing device 2400 performs one or more operations described herein by programming processor 2415. For example, processor 2415 may be programmed by encoding an operation as one or more executable instructions and by providing the executable instructions in memory device 2410.

Processor 2415 may include one or more processing units (e.g., in a multi-core configuration). Further, processor 2415 may be implemented using one or more heterogeneous processor systems in which a main processor is present with secondary processors on a single chip. In another illustrative example, processor 2415 may be a symmetric multi-processor system containing multiple processors of the same type. Further, processor 2415 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. Processor 2415 processes data received from detector 1706 to reconstruct images of object 1704. In the exemplary embodiment, processor 2415 utilizes the reconstruction algorithm described above to reconstruct images of object 1704.

In the exemplary embodiment, memory device 2410 is one or more devices that enable information such as executable instructions and/or other data to be stored and retrieved. Memory device 2410 may include one or more computer readable media, such as, without limitation, dynamic random access memory (DRAM), static random access memory (SRAM), a solid state disk, and/or a hard disk. Memory device 2410 may be configured to store, without limitation, application source code, application object code, source code portions of interest, object code portions of interest, configuration data, execution events and/or any other type of data.

In the exemplary embodiment, computing device 2400 includes a presentation interface 2420 that is coupled to processor 2415. Presentation interface 2420 presents information to a user 2425. For example, presentation interface 2420 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 2420 includes one or more display devices. Reconstructed images of object 1704 may be displayed on presentation interface 2420.

In the exemplary embodiment, computing device 2400 includes a user input interface 2435. User input interface 2435 is coupled to processor 2415 and receives input from user 2425. User input interface 2435 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 2420 and user input interface 2435.

Computing device 2400, in the exemplary embodiment, includes a communication interface 2440 coupled to processor 2415. Communication interface 2440 communicates with one or more remote devices. To communicate with remote devices, communication interface 2440 may include, for example, a wired network adapter, a wireless network adapter, and/or a mobile telecommunications adapter.

Embodiments provide a system for imaging an object using a metalens. The metalens includes a two-dimensional array including a metallic film having periodic slits. The metalens exhibits artificial dielectric behaviors and can be precisely mapped into a homogeneous dielectric slab. Further, the periodic structure results in a relatively high transmission of incident light. Using the metalens, reconstructed images have a resolution much smaller than a wavelength of the incident light.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for imaging an object, said system comprising:
   a light source configured to emit light having a predetermined wavelength towards the object;
   a metalens comprising a metallic film having a plurality of slits defined therethrough, the plurality of slits having a width a and a periodicity d that are both less than the predetermined wavelength, wherein the object is positioned between said light source and said metalens;
   a detector configured to acquire measurements indicative of light transmitted through said metalens; and
   a computing device communicatively coupled to said detector and configured to reconstruct an image of the object based on the acquired measurements.

2. A system in accordance with claim 1, wherein said metalens further comprises a plurality of dielectric elements positioned within said plurality of slits.

3. A system in accordance with claim 2, wherein said plurality of dielectric elements are substantially optically transparent.

4. A system in accordance with claim 1, wherein said plurality of slits are unfilled.

5. A system in accordance with claim 1, wherein said computing device is configured to reconstruct an image having a resolution at least a factor of two smaller than the predetermined wavelength.

6. A system in accordance with claim 1, wherein said detector is positioned proximate a detection slit of said plurality of slits.

7. A system in accordance with claim 1, further comprising a waveguide positioned between said metalens and said detector.

8. A system in accordance with claim 1, wherein the object is positioned such that at least a portion of the object lies within evanescent bulges formed at ends of the plurality of slits.

9. A system in accordance with claim 1, wherein the detector is a photodetector.

10. A system in accordance with claim 1, wherein the detector further comprises one or more optical fibers to collect light passing through the metalens.

11. A system in accordance with claim 1, wherein said detector comprises a plurality of detectors.

* * * * *